US010758935B2

(12) United States Patent
Beebe

(10) Patent No.: US 10,758,935 B2
(45) Date of Patent: Sep. 1, 2020

(54) MULTI-COMPONENT GUN

(71) Applicant: Fishman Corporation, Hopkinton, MA (US)

(72) Inventor: W. Scott Beebe, Berkley, MA (US)

(73) Assignee: Fishman Corporation, Hopkinton, MA (US)

( * ) Notice: Subject to any disclaimer, the term of this patent is extended or adjusted under 35 U.S.C. 154(b) by 186 days.

(21) Appl. No.: 15/367,905

(22) Filed: Dec. 2, 2016

(65) Prior Publication Data

US 2017/0157638 A1     Jun. 8, 2017

Related U.S. Application Data

(60) Provisional application No. 62/261,967, filed on Dec. 2, 2015.

(51) Int. Cl.
    *B05C 17/01*         (2006.01)
    *H04L 29/08*      (2006.01)
                  (Continued)

(52) U.S. Cl.
    CPC .... *B05C 17/0103* (2013.01); *B05C 17/00553* (2013.01); *B05C 17/00576* (2013.01);
                  (Continued)

(58) Field of Classification Search
    CPC ............. B05C 17/0103; B05C 17/0116; B05C 17/00553; B05C 17/01; B05C 17/00596;
                  (Continued)

(56) References Cited

U.S. PATENT DOCUMENTS

| 5,203,476 A | * | 4/1993 | Keller | ............... B05C 17/00553 |
| | | | | 222/136 |
| 5,411,180 A | * | 5/1995 | Dumelle | ........... B05C 17/00553 |
| | | | | 222/137 |

(Continued)

FOREIGN PATENT DOCUMENTS

DE        103 22 932 A1     12/2004

OTHER PUBLICATIONS

International Search Report and Written Opinion of the International Searching Authority issued in PCT/US2016/064687 dated Feb. 16, 2017.

(Continued)

*Primary Examiner* — Paul R Durand
*Assistant Examiner* — Robert K Nichols, II
(74) *Attorney, Agent, or Firm* — Mark H. Whittenberger; Holland & Knight LLP

(57) ABSTRACT

A method for dispensing fluid from a fluid dispensing apparatus. The apparatus may include a housing, wherein the housing may include a motor, and wherein the motor may be configured to be operatively connected to a power supply, wherein the motor may be further configured to be operatively connected to one or more drive rods, wherein the one or more drive rods may be configured to engage a fixed lead screw with a triangular nut, and wherein the drive rod may be further configured to engage at least two pistons of a fluid cartridge. The housing may include a controller configured to be operatively connected to the power supply, the controller may be configured to generate a pressure within the fluid cartridge by adjusting, via the motor, the drive rod and piston in a first direction relative to the fluid cartridge to dispense fluid in the fluid cartridge.

18 Claims, 13 Drawing Sheets

(51) Int. Cl.
*B05C 17/005* (2006.01)
*B05C 11/10* (2006.01)

(52) U.S. Cl.
CPC ........ *B05C 17/014* (2013.01); *B05C 17/0133* (2013.01); *H04L 67/02* (2013.01); *B05C 11/1002* (2013.01); *B05C 17/00596* (2013.01)

(58) Field of Classification Search
CPC .... B65D 81/325; A45D 40/04; A46B 11/0027
USPC ........................................ 222/412, 137, 390
See application file for complete search history.

(56) References Cited

U.S. PATENT DOCUMENTS

| | | | | |
|---|---|---|---|---|
| 6,682,601 | B1* | 1/2004 | Beebe | B05C 17/00553 118/669 |
| 7,959,612 | B2 | 6/2011 | Thompson et al. | |
| 8,256,645 | B2* | 9/2012 | Beebe | B05C 17/00593 222/333 |
| 8,418,891 | B1* | 4/2013 | Harris | A23G 3/28 222/333 |
| 2002/0161335 | A1 | 10/2002 | Metzner et al. | |
| 2003/0080152 | A1* | 5/2003 | Balcome | B05C 17/00553 222/136 |
| 2004/0045982 | A1 | 3/2004 | Herman et al. | |
| 2008/0144426 | A1 | 6/2008 | Janssen et al. | |
| 2009/0101673 | A1 | 4/2009 | Alioto et al. | |
| 2009/0287150 | A1* | 11/2009 | Dacquay | A61F 9/0017 604/114 |
| 2011/0073613 | A1 | 3/2011 | Beebe | |
| 2012/0292341 | A1* | 11/2012 | Gramann | A61C 9/0026 222/137 |
| 2013/0020350 | A1 | 1/2013 | Gardoes et al. | |
| 2014/0252025 | A1 | 9/2014 | Schmid et al. | |
| 2015/0174326 | A1 | 6/2015 | Bokelman et al. | |
| 2016/0107187 | A1 | 4/2016 | Beebe | |

OTHER PUBLICATIONS

Supplementary European Search Report issued in counterpart application Serial No. EP16871601 dated Aug. 9, 2019.
Extended European Search Report issued in counterpart application Serial No. EP16871601.

* cited by examiner

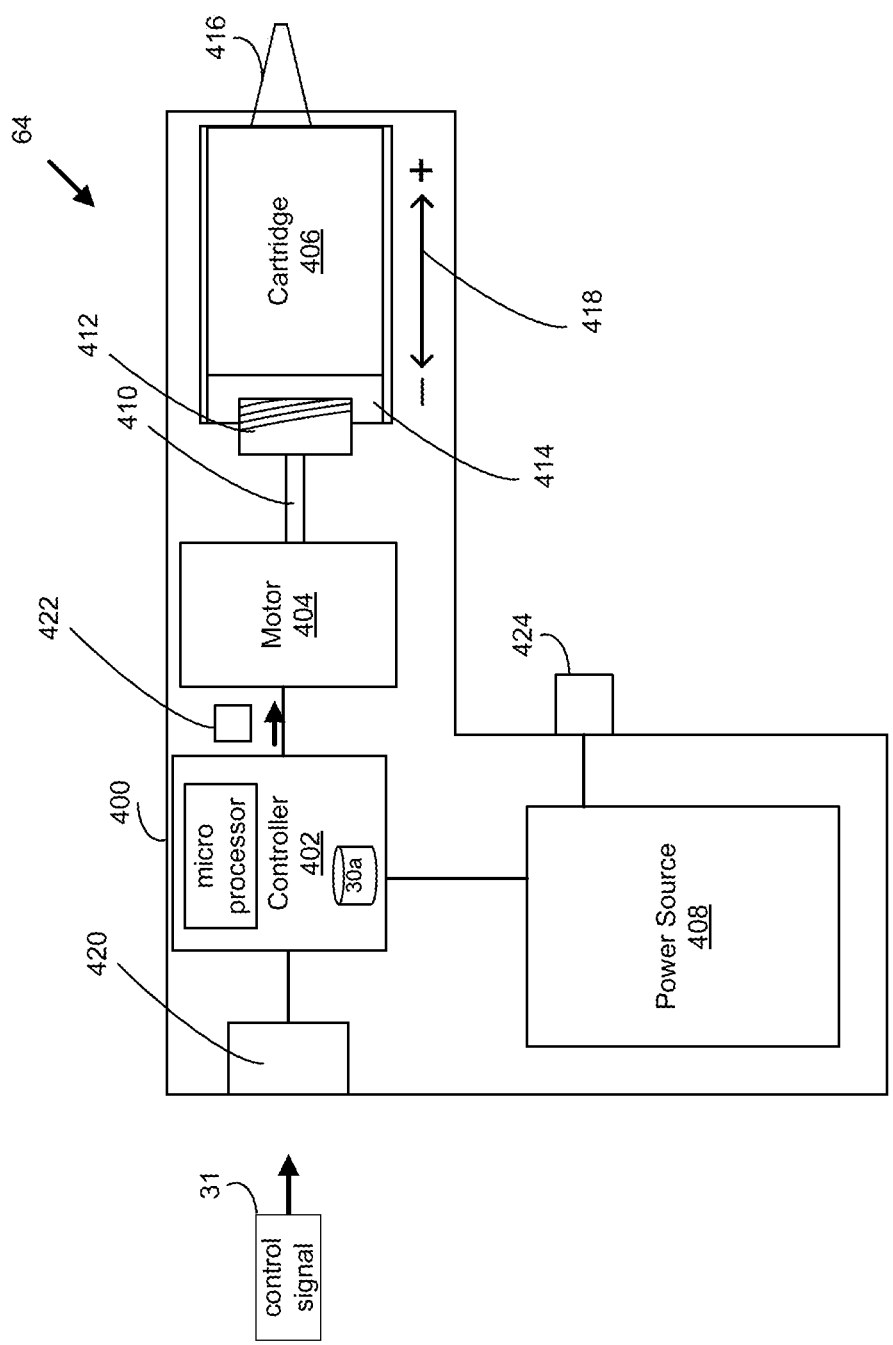

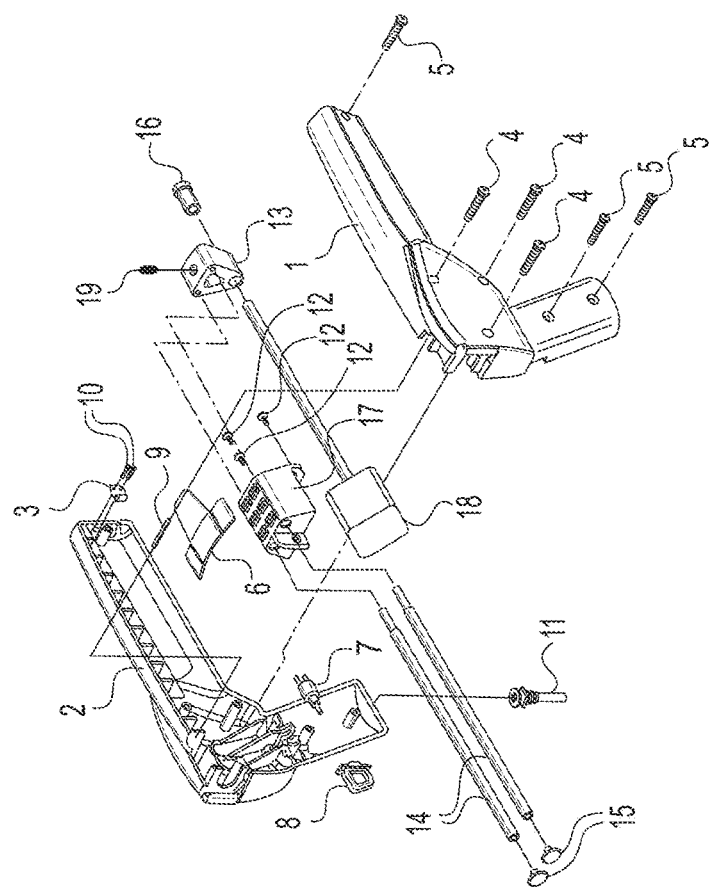

| ITEM NO. | PART NUMBER | DESCRIPTION | QTY. |
|---|---|---|---|
| 1 | T907731 | GUN SHELL RH | 1 |
| 2 | T905731 | GUN SHELL LH | 1 |
| 3 | T307750 | LIMIT SWITCH | 1 |
| 4 | T202350 | 6-9 TRILOBULAR PH X 1.0 LG | 3 |
| 5 | T203350 | 6-9 TRILOBULAR PH X .75 LG | 3 |
| 6 | T908731 | LOCKING LATCH | 1 |
| 7 | T307050 | TRIGGER SWITCH | 1 |
| 8 | T909731 | TRIGGER | 1 |
| 9 | T201350 | .063 X 1.0 SS DOWEL PIN | 1 |
| 10 | T2G0320 | 0-80 TRILOBULAR PH X .25 LG | 2 |
| 11 | T301530 | DUAL CARTRIDGES GUN CABLE (6 FOOT) | 1 |
| 12 | T2O0350 | M3 X .05 X 6mm BHCS | 3 |
| 13 | T6K7F50 | SPECIAL EXTERNAL NUT | 1 |
| 14 | T6K5550 | PLUNGER ROD | 2 |
| 15 | T6K6550 | PLUNGER BUTTON | 2 |
| 16 | T6K8F50 | SPECIAL EXT INSERT BUSHING | 1 |
| 17 | T6K9750 | PLUNGER SUPPORT | 1 |
| 18 | T3N9050 | SDAV-HT MOTOR | 1 |
| 19 | T2G7350 | SOCKET SET SCREW 6-32 X .25 | 1 |
| 20 | T3N5050 | RESISTOR FOR SDAV-HT MOTOR | 1 | NOT SHOWN |
| 21 | T286020 | LEMO STRAIGHT PLUG | 1 | NOT SHOWN |
| 22 | T287020 | STRAIN RELIEF | 1 |

*FIG. 4C*

MULTI-COMPONENT GUN

RELATED APPLICATIONS

This application claims the benefit of U.S. Provisional Application No. 62/261,967 filed on 2 Dec. 2015, entitled Multi-Component Gun, the contents of which are all incorporated by reference.

BACKGROUND

Fluid dispensing systems may be used in conjunction with a variety of fluid sources. For example, certain systems may utilize fluid-filled cartridges that may contain liquid adhesives or sealants, such as caulk or silicone. Fluid dispensing systems utilized to dispense fluid from these fluid-filled cartridges may be configured in a variety of ways. For example, the fluid dispensing system may be configured as a manually-operated mechanical mechanism (e.g., such as a caulking gun). For instance, the mechanical mechanism may include, e.g., a ratchet-actuatable plunger that a user may manually advance through the base of the fluid-filled cartridge to dispense fluid to a worksite. As another example, the fluid dispensing system may be configured as an air-driven mechanism. For instance, the user may couple the air-driven mechanism to a pressurized air source, and, in response to a user activating the air source, the air source may drive a plunger through the base of the fluid-filled cartridge to dispense fluid to a worksite.

BRIEF SUMMARY OF DISCLOSURE

In one example implementation, an apparatus may include but is not limited to a housing, wherein the housing may include a motor, and wherein the motor may be configured to be operatively connected to a power supply, wherein the motor may be further configured to be operatively connected to one or more drive rods, wherein the one or more drive rods may be configured to engage a fixed lead screw with a triangular nut, and wherein the one or more drive rod may be further configured to engage at least two pistons of a fluid cartridge. The housing may further include a controller configured to be operatively connected to the power supply, the controller may be configured to generate a positive pressure within the fluid cartridge by adjusting, via the motor, the drive rod and piston in a first direction relative to the fluid cartridge to dispense fluid in the fluid cartridge via a nozzle.

One or more of the following example features may be included. The controller may be configured to generate a drive signal to the motor to generate the positive and negative pressure within the fluid cartridge based upon the control signal. The controller may be further configured to receive a position signal from the motor, the position signal indicating a position of the piston relative to the fluid cartridge. The controller may be further configured to generate the drive signal based upon receiving at least one of a cartridge volume value, a dispense volume value, a drive rod retraction velocity value, and a drive rod retraction time delay value, wherein the drive signal may indicate how much adjustment of the drive rod and piston occurs in at least one of the first and second direction. The motor may include a stepper motor. The piston may include at least one of a plunger and a load distribution plate. A hatch may be included that may enable a user to manually spin the fixed lead screw to engage the drive rod with the piston.

In another example implementation, at least one dispensing apparatus may be configured to be operatively connected to the base station. The at least one dispensing apparatus may include a housing, wherein the housing may include a motor, and wherein the motor may be configured to be operatively connected to a power supply. The motor may be further configured to be operatively connected to one or more drive rods, wherein the one or more drive rods may be configured to engage a fixed lead screw with a triangular nut, and wherein the one or more drive rod may be further configured to engage at least two pistons of a fluid cartridge. The housing may further include a controller configured to be operatively connected to the power supply, the controller may be configured to generate a positive pressure within the fluid cartridge by adjusting, via the motor, the drive rod and piston in a first direction relative to the fluid cartridge to dispense fluid in the fluid cartridge via a nozzle.

One or more of the following example features may be included. The controller may be configured to generate a drive signal to the motor to generate the positive and negative pressure within the fluid cartridge based upon the control signal. The controller may be further configured to receive a position signal from the motor, the position signal may indicate a position of the piston relative to the fluid cartridge. The controller may be further configured to generate the drive signal based upon receiving at least one of a cartridge volume value, a dispense volume value, a drive rod retraction velocity value, and a drive rod retraction time delay value, wherein the drive signal may indicate how much adjustment of the drive rod and piston occurs in at least one of the first and second direction. The motor may include a stepper motor. The piston may include at least one of a plunger and a load distribution plate. A hatch may be included that may enable a user to manually spin the fixed lead screw to engage the drive rod with the piston.

In yet another example implementation a method is provided. The method may include providing a housing, wherein the housing includes a motor, and wherein the motor is configured to be operatively connected to a power supply. The method may include connecting the motor to one or more drive rods, wherein the one or more drive rods are configured to engage, via one or more drive rods, a fixed lead screw with a triangular nut, and wherein the one or more drive rod are further configured to engage at least two pistons of a fluid cartridge. The method may further include generating, via a controller, a positive pressure within the fluid cartridge by adjusting, via the motor, the drive rod and piston in a first direction relative to the fluid cartridge to dispense fluid in the fluid cartridge via a nozzle.

One or more of the following example features may be included. The method may include generating a drive signal to the motor to generate the positive and negative pressure within the fluid cartridge based upon the control signal. The method may further include receiving a position signal from the motor, the position signal indicating a position of the piston relative to the fluid cartridge. The method may also include generating the drive signal based upon receiving at least one of a cartridge volume value, a dispense volume value, a drive rod retraction velocity value, and a drive rod retraction time delay value, wherein the drive signal indicates how much adjustment of the drive rod and piston occurs in at least one of the first and second direction. The motor may include a stepper motor and the piston may include at least one of a plunger and a load distribution plate.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

FIG. 4a is an example diagrammatic view of a "single component" fluid dispensing apparatus of FIG. 1 according to one or more example implementations of the disclosure;

FIGS. 4b-4e are example diagrammatic views of a "multi-component" portion of a dispensing apparatus of FIG. 1 according to one or more example implementations of the disclosure;

Like reference symbols in the various drawings indicate like elements.

DETAILED DESCRIPTION

System Overview

Figure 1:
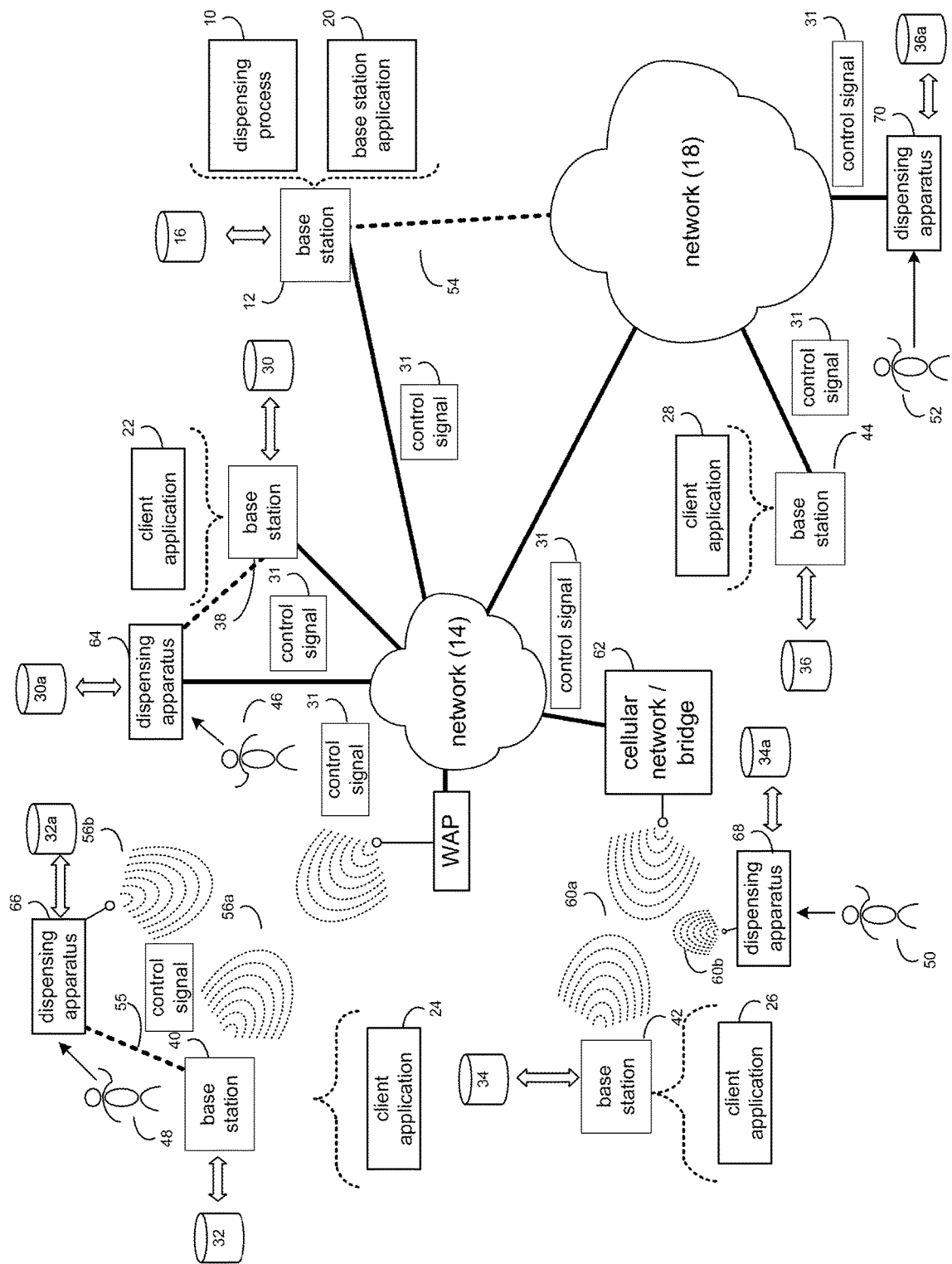
FIG. 1 is an example diagrammatic view of a dispensing process coupled to a distributed computing network according to one or more example implementations of the disclosure.

The example above-noted conventional fluid dispensing systems may suffer from one or more example deficiencies. For instance, with manually-operated, mechanical fluid dispensing systems, the user may have difficulty accurately controlling the amount of fluid dispensed from the cartridge. If the fluid dispensing system dispenses too little fluid to a product, the product may be unsafe to use as designed. Alternately, if the fluid dispensing system dispenses too much fluid to a product, the product may be unsightly, messy, or unsafe. Moreover, the wasted fluid may result in cost inefficiencies. Further, air-driven fluid dispensing systems may require a direct, physical coupling to a pressurized air source, which may limit the portability of the dispensing mechanisms (e.g., within the relatively immediate vicinity of the pressurized air source). Additionally, gearing systems (e.g., servo motor use) with springs may also be used, and may be prone to wear and breakdowns. Moreover, some conventional fluid dispensing systems may not have the ability for reverse motion, and lack piston connection.

As will be discussed in greater detail below, the present disclosure may relate to a dispensing apparatus, and more particularly, to a portable and programmable cartridge-based fluid dispensing apparatus that may be configured to accurately and reproducibly dispense a given volume of fluid from the cartridge. For example, the dispensing apparatus may include a controller disposed in wired/wireless electrical communication (e.g., operatively connected) with a motor, such as a stepper motor. In response to receipt of a control signal, such as a control signal received from a base station, the controller may be configured to generate a drive signal that may cause the motor to sequentially advance and retract a drive rod relative to the cartridge. Based upon this motion, the motor may sequentially create both a positive pressure and a negative pressure within the cartridge to result in the dispensing of a particular volume of fluid from the dispensing apparatus. The dispensing apparatus may add process control to an otherwise manual procedure. In some implementations, the dispensing apparatus may maintain substantial consistency of the volume of fluid dispensed by the apparatus on a user-by-user and/or location-by-location basis.

As will also be discussed in greater detail, in some implementations, the dispensing apparatus may include a housing and a power supply carried by the housing. The dispensing apparatus may include a stepper motor carried by the housing and disposed in electrical communication with the power supply. The stepper motor may have a drive rod and a load distribution plate configured to engage a fluid cartridge. The dispensing apparatus may include a controller carried by the housing and disposed in electrical communication with the power supply. The controller may be configured to receive a control signal and cause adjustment of the drive rod and a load distribution plate based upon the control signal.

As will be appreciated by one skilled in the art, the present disclosure may be embodied as a method, system, or computer program product. Accordingly, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium (or media) may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash (e.g., USB) memory), an optical fiber, a portable compact disc read-only memory (CD-ROM), an optical storage device, a digital versatile disk (DVD), a static random access memory (SRAM), a memory stick, a floppy disk, a mechanically encoded device such as punch-cards or raised structures in a groove having instructions recorded thereon, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of the present disclosure, a computer-usable or computer-readable, storage medium may be any tangible medium that can contain or store a program for use by or in connection with the instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. The computer readable program code may be transmitted using any appropriate medium, including but not limited to the internet, wireline, optical fiber cable, RF, etc. A computer readable signal medium may be any computer readable medium that is not a computer readable storage medium and that can communicate, propagate, or transport a program for use by or in connection with an instruction execution system, apparatus, or device.

Computer program code for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java®, Smalltalk, C++ or the like. Java and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript, PERL, or Python. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider). In some implementations, electronic circuitry including, for example, programmable logic circuitry, field-programmable gate arrays (FPGA), micro-controller units (MCUs), or programmable logic arrays (PLA) may execute the computer readable program instructions/code by utilizing state information of the computer readable program instructions to personalize the electronic circuitry, in order to perform aspects of the present disclosure.

As used in any embodiment described herein, "circuitry" may include, for example, singly or in any combination, hardwired circuitry, programmable circuitry, state machine circuitry, and/or firmware that stores instructions executed by programmable circuitry. It should be understood at the outset that any of the operations and/or operative components described in any embodiment herein may be implemented in software, firmware, hardwired circuitry and/or any combination thereof.

The flowchart and block diagrams in the figures illustrate the architecture, functionality, and operation of possible implementations of apparatus (systems), methods and computer program products according to various implementations of the present disclosure. It will be understood that each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some alternative implementations, the functions noted in the block(s) may occur out of the order noted in the figures. For example, two blocks shown in succession may, in fact, be executed substantially concurrently, or the blocks may sometimes be executed in the reverse order, depending upon the functionality involved.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

The computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Referring now to FIG. 1, there is shown dispensing process 10 that may reside on and may be executed by a computer (e.g., base station 12), which may be connected to a network (e.g., network 14) (e.g., the internet or a local area network). Examples of base station 12 (and/or one or more of the client electronic devices noted below) may include, but are not limited to, a personal computer(s), a laptop computer(s), mobile computing device(s), a server computer, a series of server computers, a mainframe computer(s), or a computing cloud(s). Base station 12 may execute an operating system, for example, but not limited to, Microsoft® Windows®; Mac® OS X®; Red Hat® Linux®, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both). In some implementations, base station 12 may be configured as a controller assembly, such as a SMARTDISPENSER dispensing unit from Fishman Corporation, Hopkinton, Mass., which may include a memory and processor, as well as a monitor, such as a touch screen display. It will be appreciated that any example base station capable of carrying out the present disclosure may be used without departing from the scope of the present disclosure. As such, the description of base station 12 should be taken as an example only and not to limit the scope of the present disclosure.

As will be discussed below in greater detail, dispensing process 10 may receive, at a fluid dispensing apparatus, a control signal, wherein the control signal may be received from a base station, wherein the control signal, when received, may cause the fluid dispensing apparatus to perform operations. The operations may include generating a positive pressure within a fluid cartridge of the fluid dispensing apparatus by adjusting, via a motor of the fluid dispensing apparatus, one or more drive rods engaging a fixed lead screw with a triangular nut and one or more pistons of the fluid dispensing apparatus in a first direction relative to the fluid cartridge to dispense fluid in the fluid cartridge via a nozzle of the fluid dispensing apparatus. The operations may include generating a negative pressure within the fluid cartridge by adjusting, via the motor, the one or more drive rods and one or more pistons in a second direction relative to the fluid cartridge to draw fluid into the fluid cartridge via the nozzle.

The instruction sets and subroutines of dispensing process 10, which may be stored on storage device 16 coupled to base station 12, may be executed by one or more processors (not shown) and one or more memory architectures (not shown) included within base station 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

Base station 12 may include a data store, such as a database (e.g., relational database, object-oriented database, triplestore database, etc.) and may be located within any suitable memory location, such as storage device 16 coupled to base station 12. Any data, metadata, information, etc. described throughout the present disclosure may be stored in the data store. In some implementations, base station 12 may utilize any known database management system such as, but not limited to, DB2, in order to provide multi-user access to one or more databases, such as the above noted relational database. The data store may also be a custom database, such as, for example, a flat file database or an XML database. Any other form(s) of a data storage structure and/or organization may also be used. Dispensing process 10 may be a component of the data store, a standalone application that interfaces with the above noted data store and/or an applet/application that is accessed via client applications 22, 24, 26, 28. The above noted data store may be, in whole or in part, distributed in a cloud computing topology. In this way, base station 12 and storage device 16 may refer to multiple devices, which may also be distributed throughout the network.

Base station 12 may execute a base station application (e.g., base station application 20), examples of which may include, but are not limited to, e.g., a controller assembly application, such as the kind found in the above-noted SMARTDISPENSER dispensing unit from Fishman Corporation, Hopkinton, Mass., or other application that allows for the receipt and/or transmission of control signals as operating instructions to one or more dispensing apparatus. Dispensing process 10 and/or base station application 20 may be accessed via client applications 22, 24, 26, 28. Dispensing process 10 may be a standalone application, or may be an applet/application/script/extension that may interact with and/or be executed within base station application 20, a component of base station application 20, and/or one or more of client applications 22, 24, 26, 28. Base station application 20 may be a standalone application, or may be an applet/application/script/extension that may interact with and/or be executed within dispensing process 10, a component of dispensing process 10, and/or one or more of client applications 22, 24, 26, 28. One or more of client applications 22, 24, 26, 28 may be a standalone application, or may be an applet/application/script/extension that may interact with and/or be executed within and/or be a component of dispensing process 10 and/or base station application 20. Examples of client applications 22, 24, 26, 28 may include, but are not limited to, e.g., a controller assembly application, such as the kind found in the above-noted SMARTDISPENSER dispensing unit from Fishman Corporation, Hopkinton, Mass., or other application that allows for the receipt and/or transmission of control signals as operating instructions to one or more dispensing apparatus, a fluid dispensing apparatus application, a standard and/or mobile web browser, a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36, 30a, 32a, 34a, 36a, coupled to client electronic devices (e.g., base stations 38, 40, 42, 44) and/or fluid dispensing apparatus 64, 66, 68, 70, may be executed by one or more processors (not shown) and one or more memory architectures (not shown) incorporated into base stations 38, 40, 42, 44 and/or fluid dispensing apparatus 64, 66, 68, 70.

Storage devices 30, 32, 34, 36, 30a, 32a, 34a, 36a, may include but are not limited to: hard disk drives; flash drives, tape drives; optical drives; RAID arrays; random access memories (RAM); and read-only memories (ROM). Examples of base stations 38, 40, 42, 44 (and/or base station 12) may include, but are not limited to, a personal computer, a laptop computer, a smart/data-enabled, cellular phone, a notebook computer, a tablet, a server, and a dedicated network device. Additionally/alternatively, base stations 38, 40, 42, 44 may include a fluid dispensing apparatus (e.g., fluid dispensing apparatus 64, 66, 68, 70). Base stations 38, 40, 42, 44 may each execute an operating system, examples of which may include but are not limited to, Android™, Apple® iOS®, Mac® OS X®; Red Hat® Linux®, or a custom operating system.

One or more of client applications 22, 24, 26, 28 may be configured to effectuate some or all of the functionality of dispensing process 10 (and vice versa). Accordingly, dispensing process 10 may be a purely server-side application, a purely client-side application, or a hybrid server-side/client-side application that is cooperatively executed by one or more of client applications 22, 24, 26, 28 and/or dispensing process 10.

One or more of client applications 22, 24, 26, 28 may be configured to effectuate some or all of the functionality of base station application 20 (and vice versa). Accordingly, base station application 20 may be a purely server-side application, a purely client-side application, or a hybrid server-side/client-side application that is cooperatively executed by one or more of client applications 22, 24, 26, 28 and/or base station application 20. As one or more of client applications 22, 24, 26, 28, dispensing process 10, and base station application 20, taken singly or in any combination, may effectuate some or all of the same functionality, any description of effectuating such functionality via one or more of client applications 22, 24, 26, 28, dispensing process 10, base station application 20, or combination thereof, and any described interaction(s) between one or more of client applications 22, 24, 26, 28, dispensing process 10, base station application 20, or combination thereof to effectuate such functionality, should be taken as an example only and not to limit the scope of the disclosure.

Users 46, 48, 50, 52 and/or fluid dispensing apparatus 64, 66, 68, 70 may access base station 12 and dispensing process 10 (e.g., using one or more of base stations 38, 40, 42, 44) directly through network 14 or through secondary network 18. Further, base station 12 may be connected to network 14 through secondary network 18, as illustrated with phantom link line 54. Dispensing process 10 may include one or more user interfaces, such as browsers and textual or graphical user interfaces, through which users 46, 48, 50, 52 may access dispensing process 10 and/or fluid dispensing apparatus 64, 66, 68, 70.

The various base stations and/or fluid dispensing apparatus 64, 66, 68, 70 may be directly or indirectly coupled to network 14 (or network 18). For example, base station 38 and fluid dispensing apparatus 64 are shown directly coupled to network 14 via a hardwired network connection. Further, base station 44 and fluid dispensing apparatus 70 are shown directly coupled to network 18 via a hardwired network connection. Base station 40 and fluid dispensing apparatus 66 are shown wirelessly coupled to network 14 via wireless communication channels 56a and 56b respectively established between base station 40 and wireless access point (i.e., WAP) 58 and between fluid dispensing apparatus 66 and WAP 58, which is shown directly coupled to network 14. WAP 58 may be, for example, an IEEE 802.11a, 802.11b, 802.11g, Wi-Fi®, and/or Bluetooth™ (including Bluetooth™ Low Energy) device that is capable of establishing wireless communication channel 56a between base station 40 and WAP 58 and wireless communication channel 56b between fluid dispensing apparatus 66 and WAP 58. Additionally/alternatively, a fluid dispensing apparatus (e.g., fluid dispensing apparatus 66) may be directly (and/or wirelessly) coupled to a base station (e.g., base station 40) as illustrated with phantom link line 55. Thus, information may be communicated to/from a fluid dispensing apparatus (e.g., fluid dispensing apparatus 66) to/from a base station (e.g., base station 40), where the information may be communicated, e.g., to base station 12 via, e.g., a network (e.g., network 14). Base station 42 and fluid dispensing apparatus 68 are shown wirelessly coupled to network 14 via wireless communication channels 60a and 60b respectively established between base station 42 and cellular network/bridge 62 and base station 68 and cellular network/bridge 62, which is shown directly coupled to network 14. It will be appreciated that any combination of the above connections may be made without departing from the scope of the present disclosure.

Some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices (e.g., base station 64, 66, 68, 70) to be interconnected using a short-range wireless connection. Other forms of interconnection (e.g., Near Field Communication (NFC)) may also be used.

Figure 2:
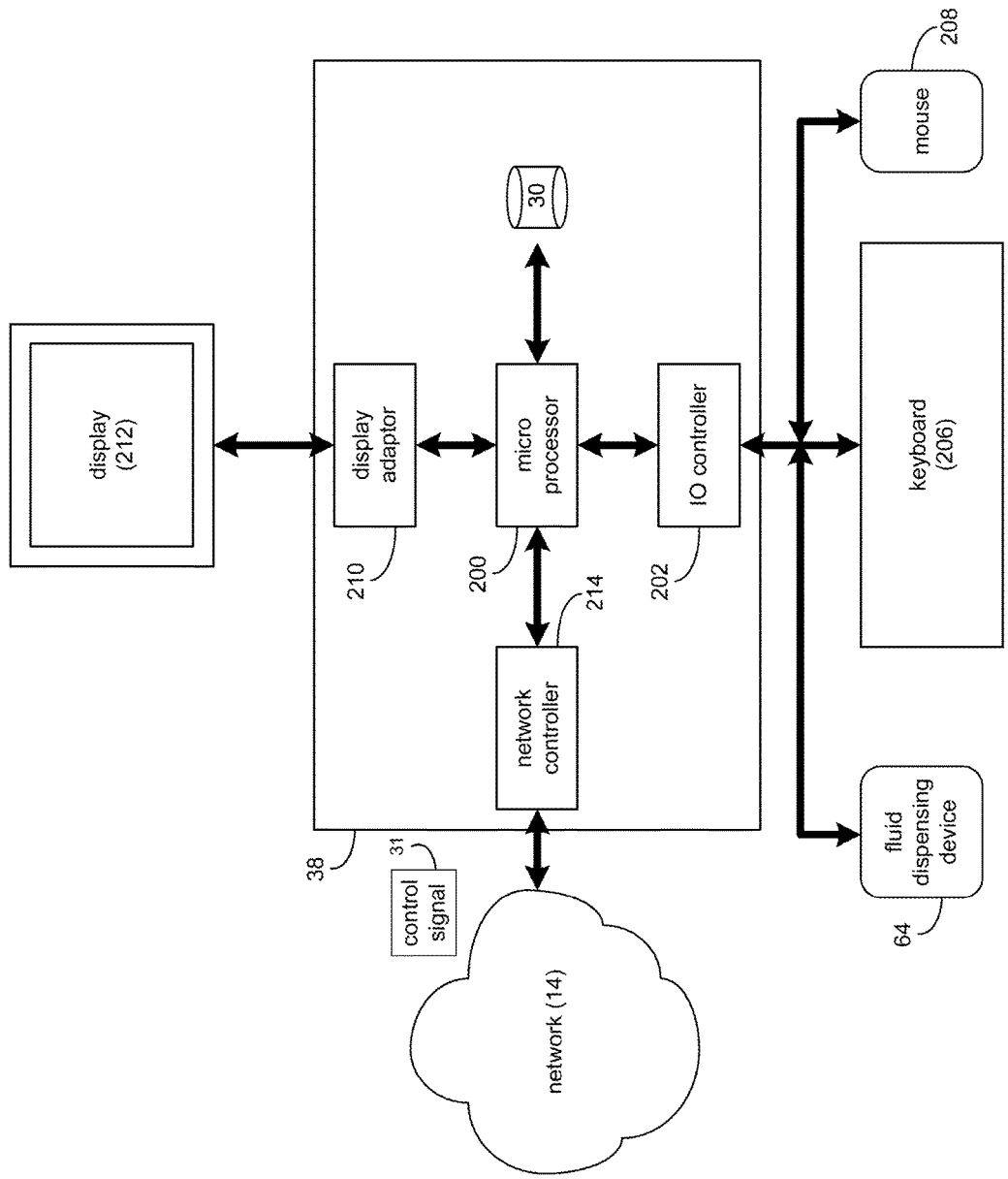
FIG. 2 is an example diagrammatic view of a base station of FIG. 1 according to one or more example implementations of the disclosure.
Figure 3:
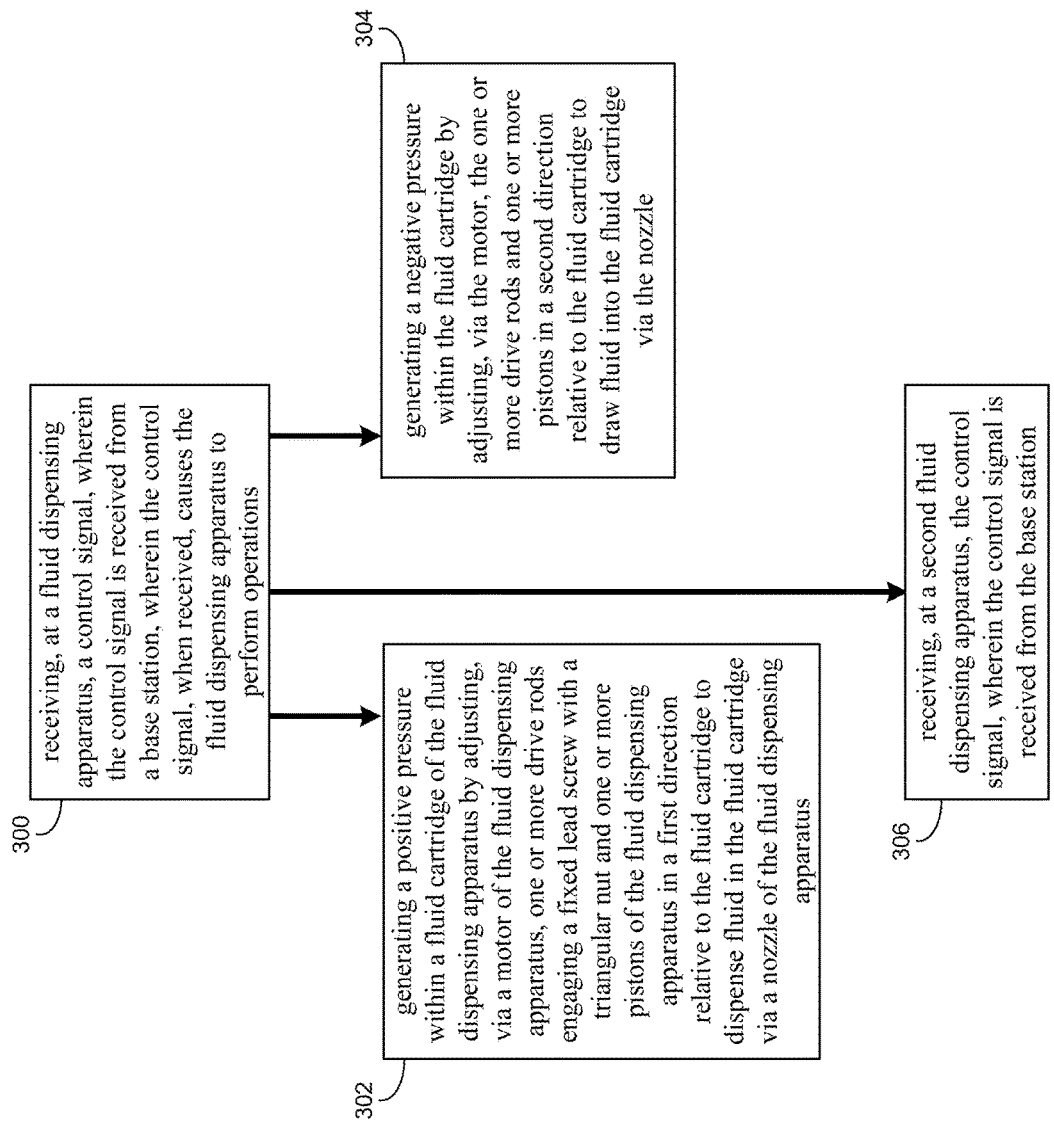
FIG. 3 is an example flowchart of the dispensing process of FIG. 1 according to one or more example implementations of the disclosure.
Figure 4B:
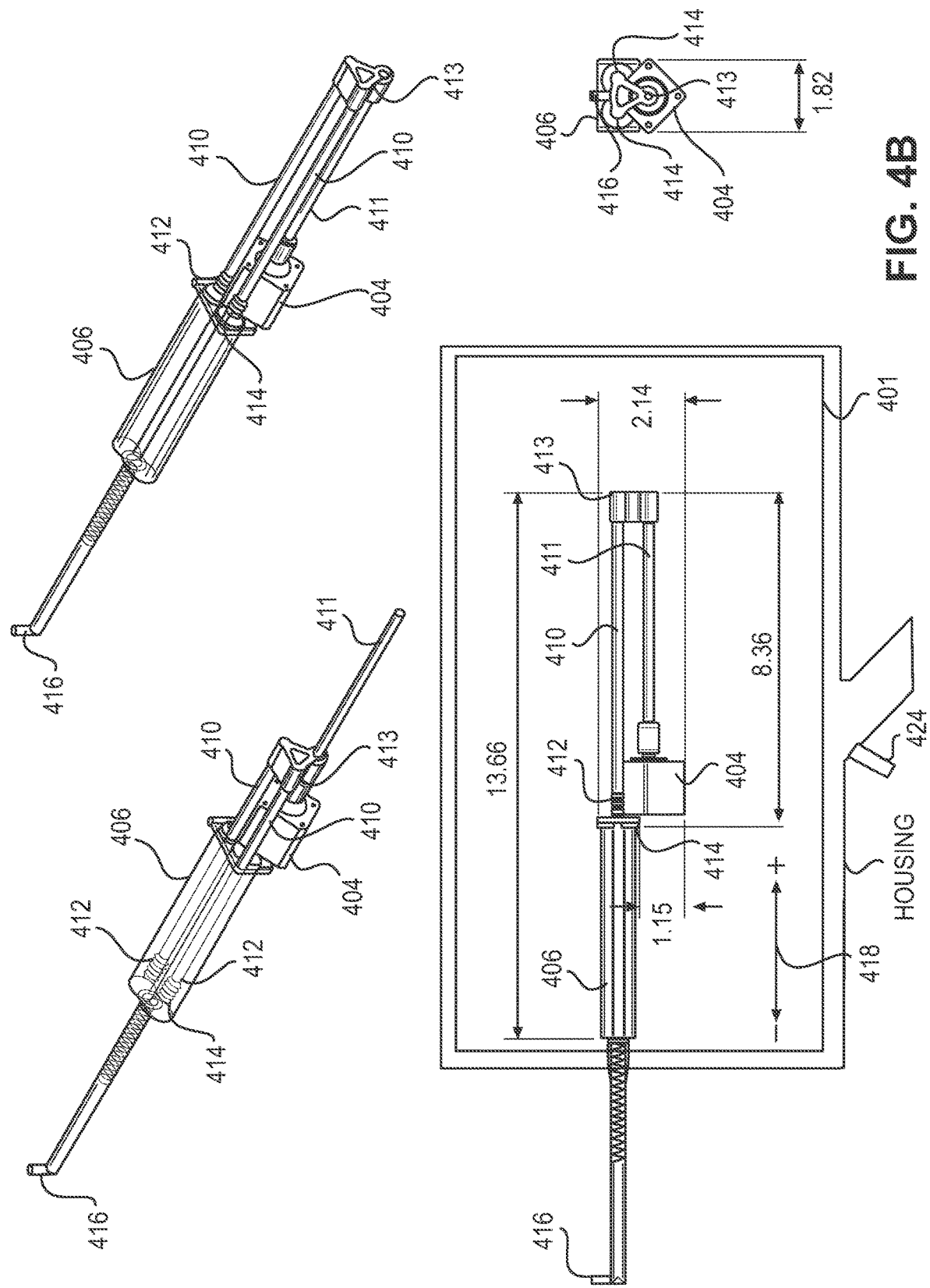
Figure 4D:
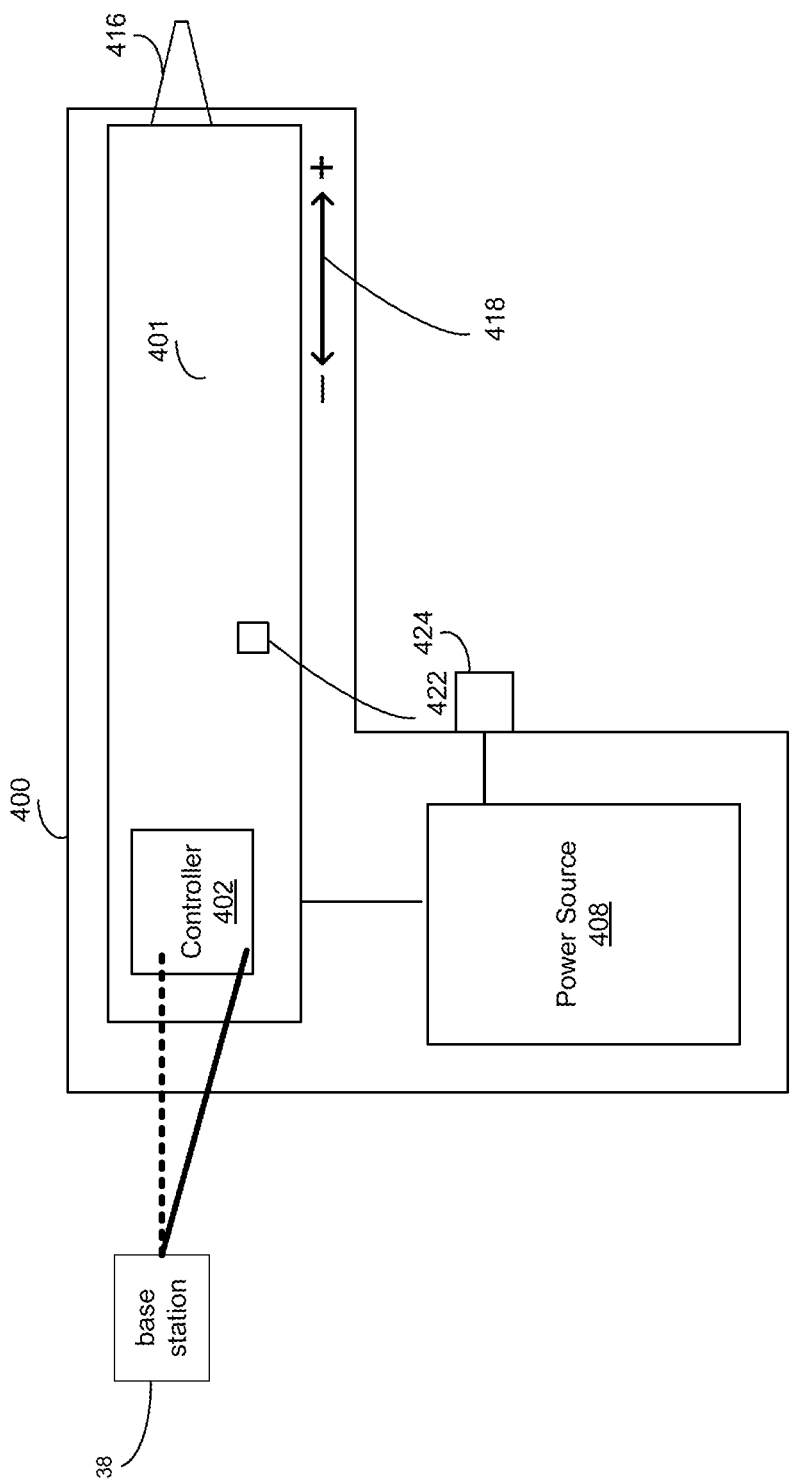
Figure 4E:
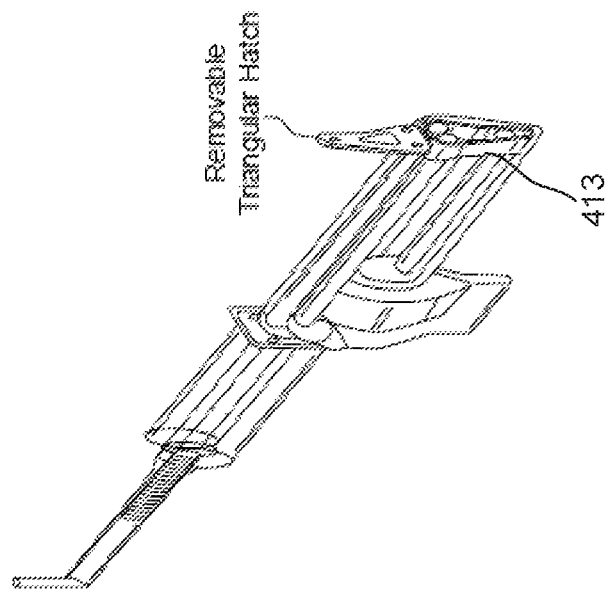
Figure 4E:
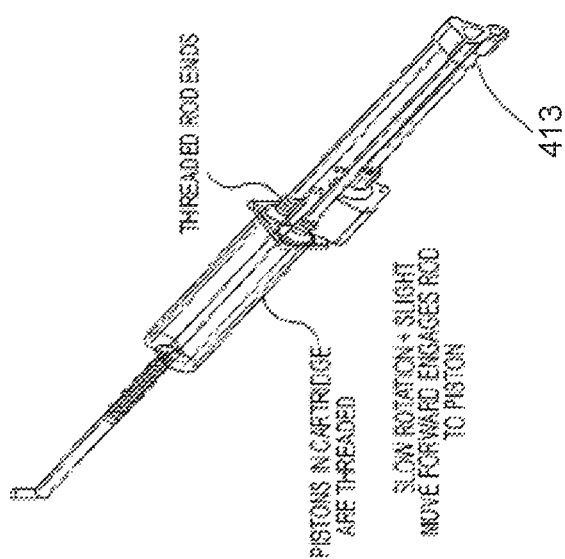

Referring also to FIG. 2, there is shown a diagrammatic view of base station 38. While base station 38 is shown in this figure, this is for illustrative purposes only and is not intended to be a limitation of this disclosure, as other configurations are possible. Additionally, any computing device capable of executing, in whole or in part, dispensing process 10 may be substituted for base station 38 within FIG. 2, examples of which may include but are not limited to base station 12 and/or base stations 40, 42, 44 and/or fluid dispensing apparatus 64, 66, 68, 70.

Base station 38 may include a processor and/or microprocessor (e.g., microprocessor 200) configured to, e.g., process data and execute the above-noted code/instruction sets and subroutines. Microprocessor 200 may be coupled via a storage adaptor (not shown) to the above-noted storage device(s) (e.g., storage device 30). An I/O controller (e.g., I/O controller 202) may be configured to couple microprocessor 200 with various devices, such as keyboard 206, pointing/selecting device (e.g., touchpad, touchscreen, mouse 208, etc.), custom device, a fluid dispensing device (e.g., fluid dispensing device 64), USB ports (not shown), and printer ports (not shown). A display adaptor (e.g., display adaptor 210) may be configured to couple display 212 (e.g., touchscreen monitor(s), plasma, CRT, or LCD monitor(s), etc.) with microprocessor 200, while network controller/adaptor 214 (e.g., an Ethernet adaptor) may be configured to couple microprocessor 200 to the above-noted network 14 (e.g., the Internet or a local area network).

The Dispensing Process:

As discussed above and referring also at least to FIGS. 1-8, in some implementations, the present disclosure may relate to a dispensing apparatus, and more particularly, to a fluid dispensing apparatus that may be configured to accurately and reproducibly dispense a given volume of fluid from the cartridge. For example, as will be discussed in greater detail, the (fluid) dispensing apparatus may include a controller disposed in wired electrical communication (e.g., operatively connected) with a motor, such as a stepper motor. The controller may be configured to generate a drive signal that may cause the motor to sequentially advance and retract a drive rod relative to the cartridge. Based upon this motion, the motor may sequentially create both a positive pressure and/or a negative pressure within the cartridge to result in the dispensing of a particular volume of fluid from the dispensing apparatus. The dispensing apparatus may add process control to an otherwise manual procedure.

For example, and referring also at least to FIGS. 4b-4e and 8, an example multiple component portion 401 of a fluid dispensing apparatus 400 is shown. It will be appreciated that the example dimensions shown in FIGS. 4c-4d may vary without departing from the scope of the disclosure. In some implementations, the above-noted motor may be configured to interact with cartridge 406 to dispense fluid from fluid dispensing apparatus 400. For example, the above-noted motor 404 may include one or more drive rods (e.g., drive rods 410) having a respective coupling mechanism (e.g., coupling mechanism 412) disposed at its distal end. In some implementations, drive rods 410 may be configured to engage a fixed lead screw (e.g., fixed lead screw 411) with a nut (e.g., triangular nut 413). Fixed lead screw 411 may be a threaded rod, from which a triple slide bar shown may slide down and up as a nut (or similar) rotates respectively via the motor. Unlike a single component gun (where a screw may move through the motor), the screw of the multi-component gun does not move through the motor. Coupling mechanism 412 may be configured to secure drive rods 410 to at least two pistons (e.g., plungers 414) associated with cartridge 406. In some implementations, as the above-noted motor 404 may cause triangular nut 413 to move in a forward or reverse direction, drive rods 410 and their respective plungers 414 similarly move, to create positive or negative pressure to dispense fluid via nozzle 416. As will be discussed below, the controller may allow for the cartridge size, dispense volume, rate of dispense, amount of reverse motion, etc. to be programmed. This moves the lead screw back and forth in the exact same motion every time automatically. The controller may save multiple programs.

In some implementations, cartridge 406 may include two or more separate "tubes" (or the like) containing fluid. In some implementations, the fluid in each tube may be different, such as two fluid epoxy ingredients, that may be activated when mixed together as each fluid simultaneously is dispensed via nozzle 416. In some implementations, cartridge 406 may include a single fluid, where having two drive rods and plungers may help provide a more even distribution of force on cartridge 406 when the fluid is being dispensed. In some implementations, and referring at least to FIG. 4e, a "hatch" or "trap door" may allow a user to manually spin the screws by thumb to engage the drive rod with the cartridge piston.

As noted above, fluid dispensing apparatus 400 to perform operations. For example, in some implementations, the operations may include generating a positive pressure within a fluid cartridge (e.g., cartridge 406) of fluid dispensing apparatus 400 by adjusting, via motor 404 of fluid dispensing apparatus 400, drive rod 410 and piston (e.g., plunger 414) of fluid dispensing apparatus 400 via multi-component portion 401 in a first direction relative to fluid cartridge 406 to dispense fluid in fluid cartridge 406 via a nozzle (e.g., nozzle 416) of fluid dispensing apparatus 400, and the operations may include generating a negative pressure within fluid cartridge 406 by adjusting, via motor 404, drive rod 410 and piston (e.g., plunger 414) of multi-component portion 401 in a second direction relative to fluid cartridge 406 to draw fluid into fluid cartridge 406 via nozzle 416. For instance, during operation, motor 404 (via dispensing process 10) may advance drive rod 410 and plunger 414, along the "+" direction of axis 418. This motion may generate a positive pressure within cartridge 406 and advance fluid contained within cartridge 406 onto a work piece via nozzle 416. In some implementations, after dispensing a particular volume of fluid onto the work piece, motor 404 may retract drive rod 410 and plunger 414 along the "−" direction of axis 418. This motion may generate a negative pressure within cartridge 406 and draw fluid from nozzle 416 back into cartridge 406, which may minimize leakage onto the work piece and reduce fluid wasting.

In some implementations, a drive signal 422 generated by a controller (not shown) coupled to motor 404 may be configured to address a variety of operating parameters associated with fluid dispensing apparatus 400. For example, drive signal 422 may include a cartridge volume value, which may relate to the volume of cartridge 406 carried by fluid dispensing apparatus 400. For instance, as noted above, cartridge 406 may be configured in a variety of volume or "syringe" sizes, such as 1 ounce, 2.5 ounces, 6 ounces, 8 ounces, 12 ounces, 20 ounces, and 32 ounces. In some implementations, drive signal 422 may include a dispense volume value (e.g., in cubic centimeters), which may relate to the volume of fluid to be dispensed by fluid dispensing apparatus 400, a drive rod forward velocity value, which may relate to the speed of forward motion by fluid dispensing apparatus 400 when dispensing fluid, a drive rod retraction amount value, which may relate to the amount of "back off" (e.g., reverse) motion during a retraction of the drive rod, a drive rod retraction velocity value, which may relate to the speed of reverse motion by fluid dispensing apparatus 400 when minimizing leakage of the fluid from the cartridge onto a work piece, and a drive rod retraction time delay value, which may relate to the time delay between the sequential positive "+" and negative "−" motion of drive rod 410. Based upon, at least in part, these parameters associated with drive signal 422, the controller may generate the drive signal, which may drive motor 404 and control the volume of fluid dispensed from cartridge 406 during a dispensing procedure.

In some implementations, an operator may depresses a "trigger" (e.g., trigger 424) to activate power source 408. In the example, based upon, at least in part, receiving a resulting power signal from activated power source 408, controller 402 may generate the above-noted drive signal 422. For example, controller 402 may generate the corresponding drive signal 422, which may cause motor 404 to position drive rod 410 and plunger 414. For example, drive signal 422 may cause motor 404 to advance drive rod 410 and plunger 414 at a given rate from a first position, to a second position relative to cartridge 406 to dispense a desired, metered volume of fluid from cartridge 406 via nozzle 416.

In some implementations, in response to actuating drive rod 410 and plunger 414, motor 404 (via dispensing process 10) may be configured to generate a position signal indicative of the position of the plunger 414 relative to cartridge 406, and may provide the position signal to controller 402, which may store the position signal. For instance, assume for example purposes only that motor 404 is a stepper motor. In the example, the stepper motor (via dispensing process 10) may generate a set of counts that may indicate the position of plunger 414. Further in the example, controller 402 may store the count from motor 404, which may enable controller 402 to identify the position of plunger 414 (via the position signal), and/or the remaining volume of fluid contained by cartridge 406. For example, if the count from motor 404 indicates that that the position of plunger 414 is (or estimated to be) half way through the total possible counts allotted to cartridge 406 (according to its size), controller 402 may identify that plunger 414 is half way between each end of cartridge 406, and may contain half of its original volume of fluid. In the example, should fluid dispensing apparatus 64 be used at intermittent times, controller 402 (via dispensing process 10) may maintain a record of the position of drive rod 410 and plunger 414 within fluid dispensing apparatus 400.

In some implementations, as indicated above, trigger 424 may be configured as an electrical activation mechanism. For example, engagement of trigger 424 may activate power source 408 to provide a power signal to controller 402. In the example, controller 402 may provide drive signal 422 to electrically activate motor 404.

It will be appreciated that a mechanical activation mechanism may be used without departing from the scope of the disclosure. For example, fluid dispensing apparatus 400 may include a mechanical activation mechanism, which may enable manual activation of motor 404. For instance, the mechanical activation mechanism may be configured in a variety of ways. For example, in some implementations, the mechanical activation mechanism may define a ring structure. Ring structure may enable a user to grasp and operate mechanical activation mechanism in a relatively easy manner.

In some implementations, mechanical activation mechanism may be disposed in operative communication with drive rod 410. For example, mechanical activation mechanism 428 may be configured as a series of linkage elements. Dispensing apparatus 400 may include a mode selector, such as a switch, that may enable a user to select either the mechanical activation mechanism or the electrical activation mechanism via trigger 424 as the motor controller.

In some implementations, as a user positions mechanical activation mechanism along the "+" direction of an axis, mechanical activation mechanism may cause drive rod 410 to translate along the "+" direction of axis 418. This motion may via multi-component portion 401 generate the above-noted positive pressure within cartridge 406 and advance fluid contained within cartridge 406 onto a work piece via nozzle 416. In some implementations, following dispensing of the fluid, user 46 may position mechanical activation mechanism along the "−" direction of an axis, which may cause drive rod 410 to translate along the "−" direction of axis 418. This motion may generate the above-noted negative pressure within cartridge 406 and draw fluid from nozzle 416 back into cartridge 406.

As discussed above, motor 404 may interact with cartridge 406 to dispense fluid from the fluid dispensing apparatus 400 via coupling mechanism 412, which may secure drive rod 410 to a base portion (e.g., base portion 440) of cartridge 406. It will be appreciated that this implementations is an example, as other example implementations are possible without departing from the scope of the disclosure. For example, in some implementations, motor 404 may include drive rod 410 and piston (e.g., load distribution plate) carried by drive rod 410. In the example, load distribution plate 443 may be disposed in proximity to base portion of cartridge 406 and may be configured to move base portion along axis 418. For example, motor 404 may advance drive rod 410 and a load distribution plate against base portion of cartridge 406 along the "+" direction of axis 418. In the example, this motion may generate the above-noted positive pressure within cartridge 406 and advance fluid contained within cartridge 406 onto a work piece via nozzle 416. In the example, motor 404 may retract drive rod 410 and load distribution plate 422 along the "−" direction of axis 418. In the example, this motion may generate the above-noted negative pressure within cartridge 406 and draw fluid from nozzle 416 back into cartridge 406.

As discussed above and referring also at least to FIGS. 4a, and 5-7, dispensing process 10 may receive 300, at a fluid dispensing apparatus, a control signal, wherein the control signal may be received 300 from a base station, wherein the control signal, when received 300, may cause the fluid dispensing apparatus to perform operations. The operations may include dispensing process 10 generating 302 a positive pressure within a fluid cartridge of the fluid dispensing apparatus by adjusting, via a motor of the fluid dispensing apparatus, a drive rod and piston of the fluid dispensing apparatus in a first direction relative to the fluid cartridge to dispense fluid in the fluid cartridge via a nozzle of the fluid dispensing apparatus. The operations may include dispensing process 10 generating 304 a negative pressure within the fluid cartridge by adjusting, via the motor, the drive rod and piston in a second direction relative to the fluid cartridge to draw fluid into the fluid cartridge via the nozzle.

As noted above, in some implementations, the present disclosure may relate to a dispensing apparatus, and more particularly, to a portable and programmable cartridge-based fluid dispensing apparatus that may be configured to accurately and reproducibly dispense a given volume of fluid from the cartridge. For example, as will be discussed in greater detail, the (fluid) dispensing apparatus may include a controller disposed in wired/wireless electrical communication (e.g., operatively connected) with a motor, such as a stepper motor. In response to receipt of a control signal, such as a control signal received from a base station, the controller may be configured to generate a drive signal that may cause the motor to sequentially advance and retract a drive rod relative to the cartridge. Based upon this motion, the motor may sequentially create both a positive pressure and/or a negative pressure within the cartridge to result in the dispensing of a particular volume of fluid from the dispensing apparatus. The dispensing apparatus may add process control to an otherwise manual procedure. In some implementations, the dispensing apparatus may maintain substantial consistency of the volume of fluid dispensed by the apparatus on a user-by-user and/or location-by-location basis.

For example, in some implementations, dispensing process 10 may receive 300, at a fluid dispensing apparatus (e.g., fluid dispensing apparatus 64), a control signal (e.g., control signal 31). As will be discussed in greater detail below, the control signal may be received 300 from a base station (e.g., base station 38), wherein control signal 31, when received 300, may cause fluid dispensing apparatus 64 to perform operations. Referring again at least to FIG. 1, an example arrangement of a dispensing system is shown that may include at least one base station (e.g., base station 38) and one or more dispensing apparatuses 64. In some implementations, base station 64 (via base station application 20, dispensing process 10, client application 22 or combination thereof) may be configured to generate a control signal (e.g., control signal 31) that may define the operational parameters of one or more of the dispensing apparatuses, and may provide control signal 31 to one or more of the dispensing apparatuses. For example, as noted above, base station 38 may be configured as a controller assembly. In some implementations, using base station 38, the desired operational parameters may be received by dispensing process 10 via a user (e.g., user 46) entering the operational parameters. For instance, dispensing process 10 may provide a user interface (not shown) that may enable user 46 to enter the desired operational parameters at base station 38, which may then be converted by dispensing process 10 into control signal 31. As will be discussed in greater detail, control signal 31 may include information such as, e.g., the volume of the fluid filled cartridge used by fluid dispensing apparatus 64, the dispense volume value (e.g., the amount of the fluid to be dispensed), the drive rod retraction velocity value (e.g., the retraction velocity value of the drive rod of fluid dispensing apparatus 64), and the drive rod retraction time delay value (e.g., the time delay after dispensing the volume value before retracting the drive rod of fluid dispensing apparatus 64).

Control signal 31 may be received 300 by dispensing apparatus 64 via base station 38 in a variety of example techniques, as discussed above regarding at least FIG. 1. For example, in some implementations, control signal 31 may be received 300 from base station 38 via a wired connection from base station 38 to fluid dispensing apparatus 64. In some implementations, control signal 31 may be received 300 from base station 38 via a wireless connection from base station 38 to fluid dispensing apparatus 64. In some implementations, control signal 31 may be stored in, e.g., storage device 30. Assume for example purposes only that storage device 30 includes a portable storage device, such as a Universal Serial Bus (USB) storage device. In the example, user 46 may remove the USB storage device and then upload control signal 31 to fluid dispensing apparatus 64 using known techniques to receive 300 control signal 31. It will be appreciated that once received 300, control signal 31 may be stored in any of the above-noted storage devices, such as storage device 30a, "on" fluid dispensing apparatus 64 as part of fluid dispensing apparatus 64. In some implementation, fluid dispensing apparatus 64 may be considered a "smart gun", capable of implementing any portion of base station application 20, dispensing process 10, client application 22 or combination thereof (as well as storing via any of the disclosed techniques any portion of base station application 20, dispensing process 10, client application 22 or combination thereof "on" fluid dispensing apparatus 64 via storage device 30a for execution by a processor and/or memory architecture on fluid dispensing apparatus 64) to carry out the instructions of at least dispensing process 10. Thus, in some implementations, fluid dispensing apparatus 64 may be independently capable of generating and/or carrying out the instruction set(s) of at least dispensing process 10. In some implementations, control signal 31 may be generated and/or received 300 at fluid dispensing apparatus 64 via the instruction set(s) of at least dispensing process 10 stored on storage device 30a (e.g., without requiring a separate control signal from a base station).

In some implementations, a second fluid dispensing apparatus (e.g., fluid dispensing apparatus 66) may receive 306 control signal 31 from dispensing process 10, wherein control signal 31 may be received 306 from base station 38. For example, in some implementations, base station 38 (e.g., via dispensing process 10) may be configured to selectively transmit control signal 31 as a common set of operating instructions to a plurality of fluid dispensing apparatuses (e.g., one or more of the fluid dispensing apparatus operatively connected to base station 38, such as fluid dispensing apparatuses 64, 66, 68, 70). For instance, the dispensing apparatuses may be utilized in different locations, e.g., of a facility, as part of the assembly of a single item (e.g., an airplane wing or portion of an airplane wing). By providing a common set of operating instructions to the select fluid dispensing apparatuses by location (in the facility or elsewhere) and/or by item being assembled, base station 64 (via dispensing process 10) may ensure substantial uniformity in the volume of liquid dispensed from all of the selected fluid dispensing apparatuses at a particular location (e.g., facility). In some implementations, the above-noted user interface may be used by user 46 to individually and/or collectively select which fluid dispensing apparatuses may receive 300/306 control signal 31, and/or which fluid dispensing apparatuses may receive 300/306 a distinct custom control signal.

In some implementations, control signal 31 may be received 300 from base station 38 via a second base station (e.g., base station 12). For instance, base station 12 may be configured to communicate with other base stations (e.g., base station 38) as part of a network (e.g., an industrial network), such as network 14/18. For instance, assume for example purposes only that base station 12 is a host base station, and further assume that user 46 has entered the desired operational parameters at base station 12 instead of base station 38. In the example, base station 12 (via dispensing process 10) may forward control signal 31 resulting from the operational parameters to other base stations operatively connected to base station 12, such as base station 38, which may then transmit control signal 31 to fluid dispensing apparatus 64. Accordingly, dispensing parameters entered at host base station 12 may be transmitted to fluid dispensing apparatus 64 (via base station 38) located anywhere within communicational contact, which may enable the fluid dispensing apparatuses to operate consistently for a particular task, regardless of their geographic locations.

While one or more examples of receiving 300/306 control signal 31 are described throughout, it will be appreciated that any technique for fluid dispensing apparatus 64 to receive control signal 31 may be used without departing from the scope of the disclosure. Similarly, any technique for base station 12 (or any other computing device) to generate and/or transmit control signal 31 to fluid dispensing apparatus 64 may be used without departing from the scope of the disclosure. As such, the description of generating, transmitting, and receiving control 31 should be taken as an example only and not to otherwise limit the scope of the disclosure.

Figure 5:
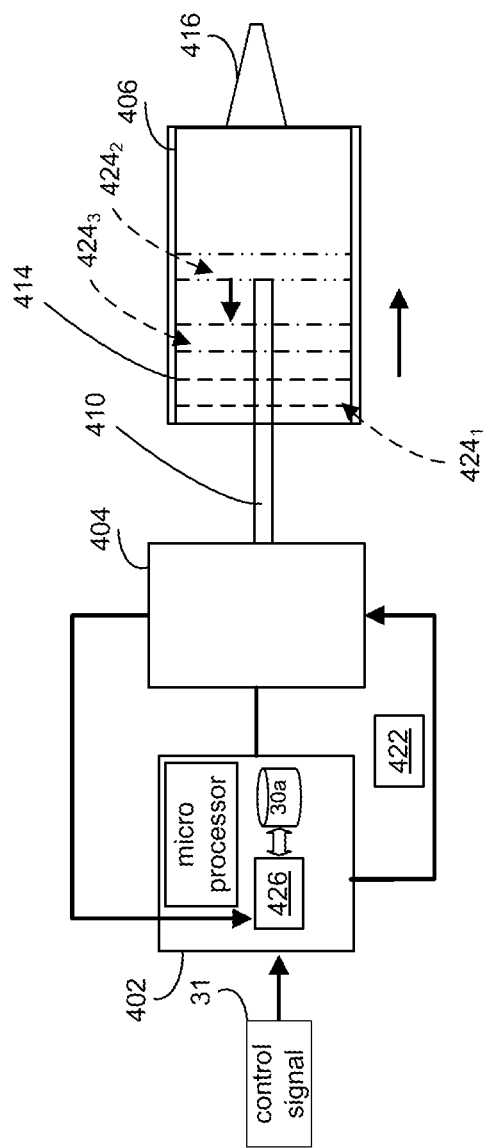
FIG. 5 is an example diagrammatic view of a controller and motor of the fluid dispensing apparatus of FIG. 1 according to one or more example implementations of the disclosure.
Figure 6:
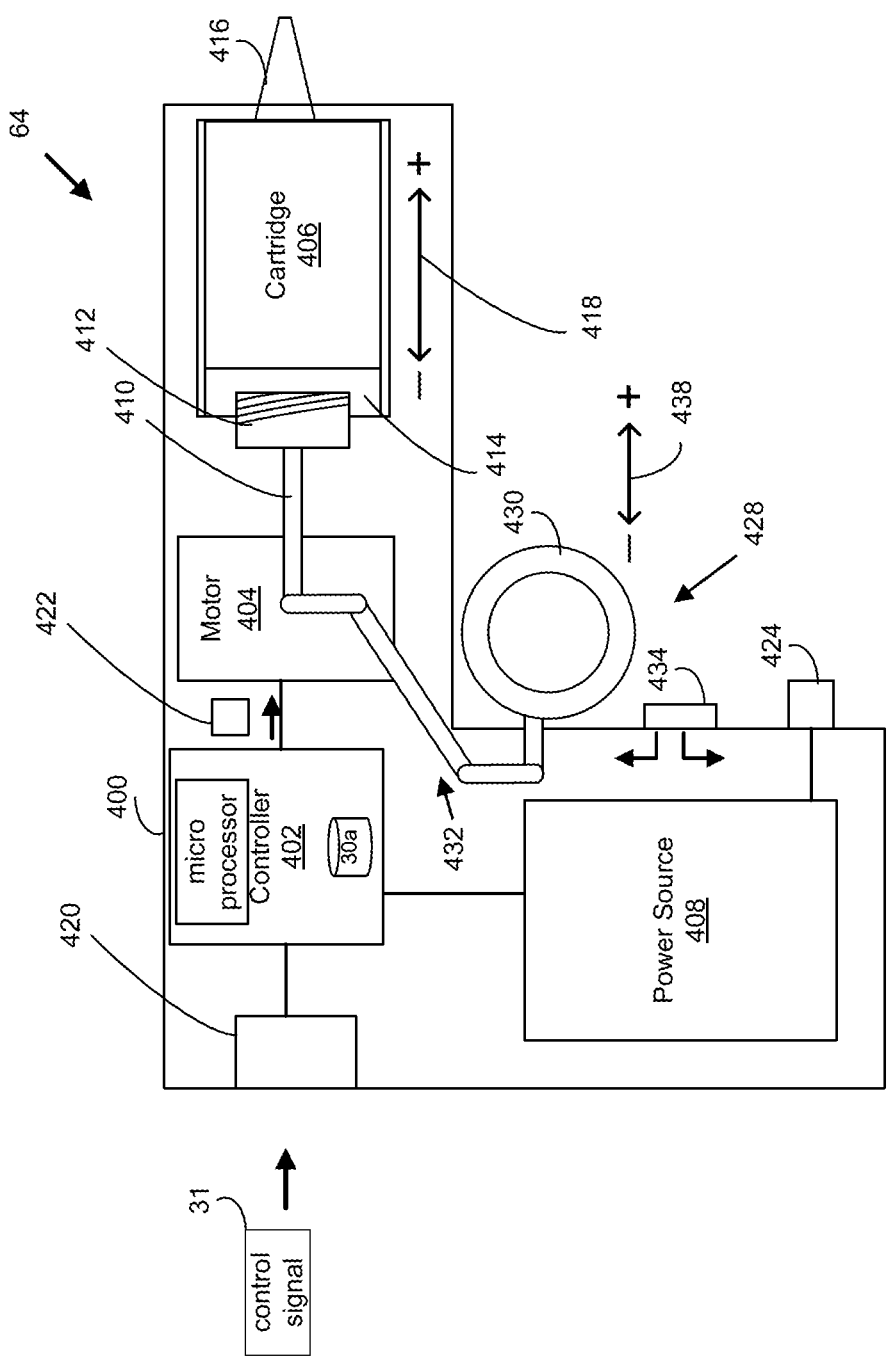
FIG. 6 is an example diagrammatic view of a fluid dispensing apparatus of FIG. 1 according to one or more example implementations of the disclosure.
Figure 7:
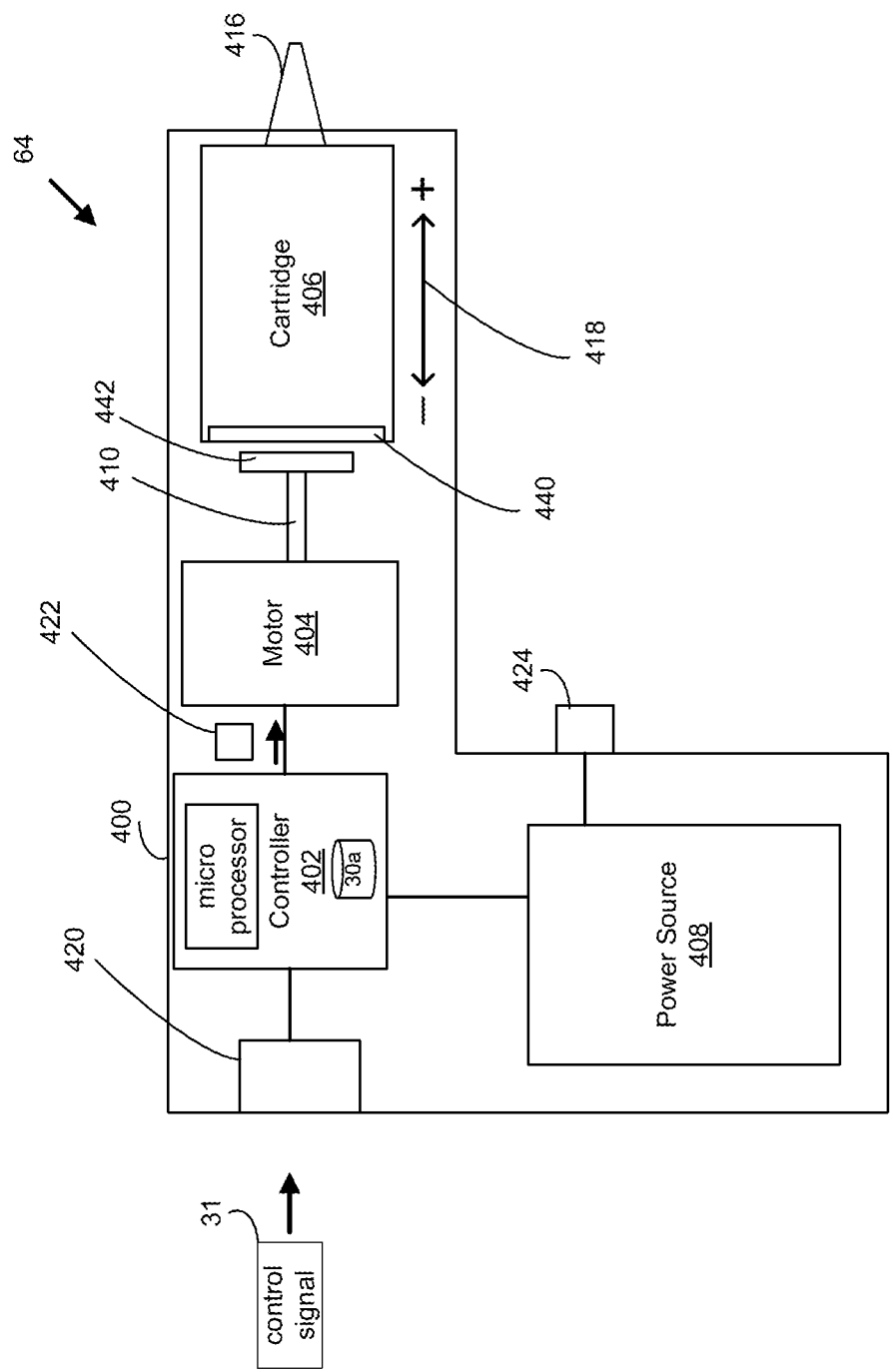
FIG. 7 is an example diagrammatic view of a fluid dispensing apparatus of FIG. 1 according to one or more example implementations of the disclosure.
Figure 8:
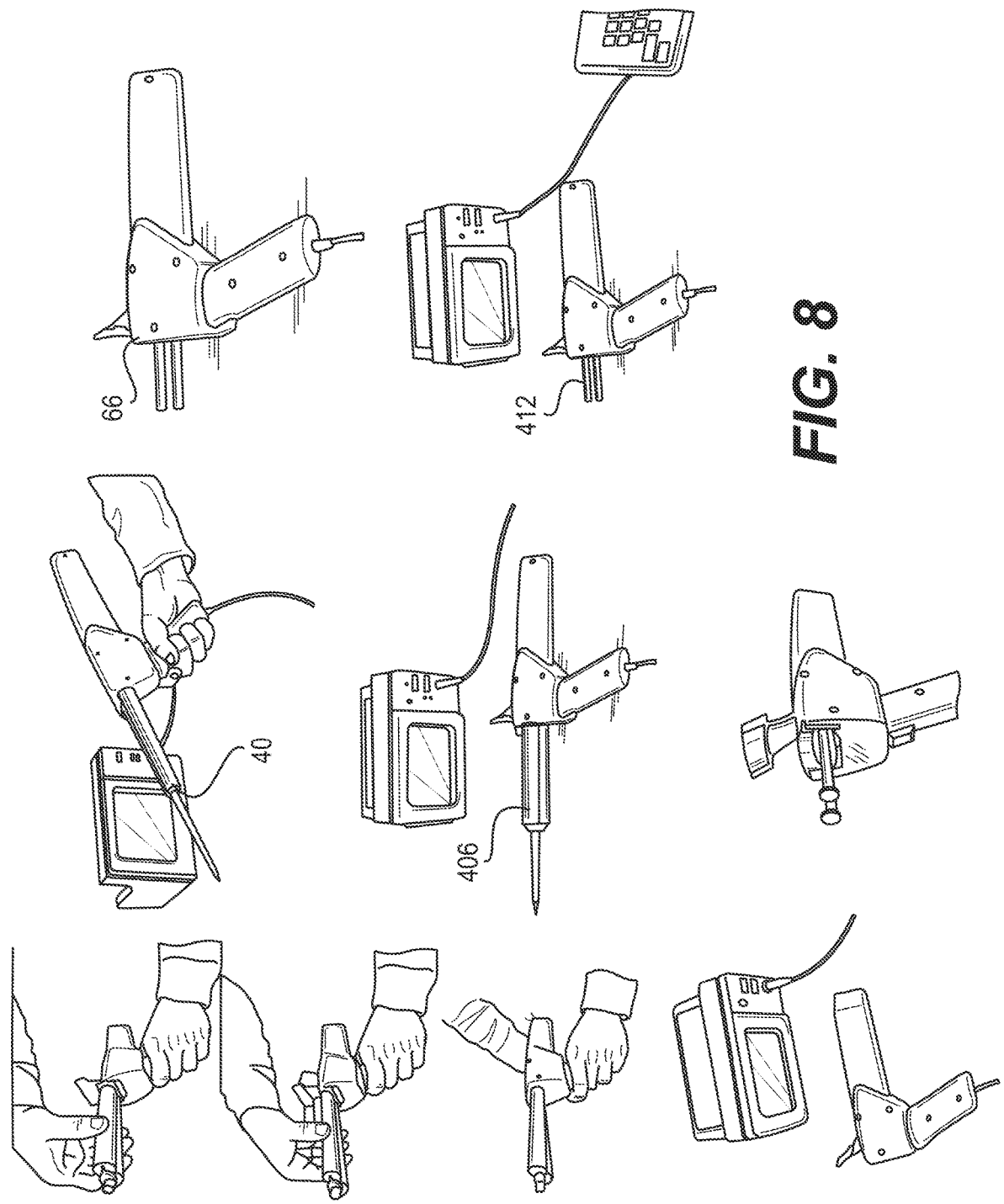
FIG. 8 is example photos of a multi-component fluid dispensing apparatus of FIG. 1 according to one or more example implementations of the disclosure.

In some implementations, and referring at least to FIGS. 4a and 5, an example fluid dispensing apparatus 64 is shown. In the example, fluid dispensing apparatus 64 may be configured to accurately and reproducibly dispense a given volume of fluid from a fluid cartridge. For instance, example FIG. 4a shows an example sectional view of an example schematic representation of an example fluid dispensing apparatus 64. In the example, fluid dispensing apparatus 64 may include, e.g., a housing (e.g., housing 400) that may include a controller (e.g., controller 402), a motor (e.g., motor 404), such as a stepper motor, which may be operatively connected with controller 402, a cartridge (e.g., cartridge 406) disposed in mechanical operation with motor 404, and a power source (e.g., power source 408), such as a battery or wired connection to a power outlet, disposed in electrical communication with controller 402 and motor 404.

In some implementations, power source 408 may be capable of inductive (e.g., wireless) charging using known techniques. For example, power source 408 may be configured to use an electromagnetic field to transfer energy between two objects. This may be accomplished with a charging station. Energy may be sent through an inductive coupling to an electrical device, which may then use that energy to charge power source 408 and/or run fluid dispensing apparatus 64. For instance, induction chargers may use an induction coil to create an alternating electromagnetic field from within a charging base (e.g., charging station), and a second induction coil in fluid dispensing apparatus 64 may receive power from the electromagnetic field and convert it back into electric current to charge/run power source 408.

As will be discussed in greater detail below, other example configurations of fluid dispensing apparatus 64 may be used without departing from the scope of the disclosure. For instance, power source 408 may be outside housing 400, but still in electrical communication with controller 402 and motor 404. As such, the example fluid dispensing apparatus 64 should be taken as an example only and not to limit the scope of the disclosure.

In some implementations, cartridge 406 may define a volume that contains a fluid, such as an adhesive; however, it will be appreciated that other fluids may be used as well. For example, cartridge 406 may be configured as a 2.5 ounce, 6 ounce, 8 ounce, 20 ounce, or 32 ounce container; however, it will be appreciated that other volumes may be used as well. In some implementations, cartridge 406 may be configured as a single-use fluid source. For example, during operation, fluid dispensing apparatus 64 (via dispensing process 10) may dispense fluid contained by cartridge 406 to, e.g., a work piece until cartridge 406 is empty. The emptied cartridge 406 may then be removed from fluid dispensing apparatus 64, where a new full cartridge may be inserted in its place for continued operation.

In some implementations, motor 404 (via dispensing process 10) may be configured to interact with cartridge 406 to dispense fluid from fluid dispensing apparatus 64. For example, motor 404 may include a drive rod (e.g., drive rod 410) having a coupling mechanism (e.g., coupling mechanism 412) disposed at its distal end. Coupling mechanism 412 may be configured to secure drive rod 410 to a piston (e.g., plunger 414) associated with cartridge 406. It will be appreciated that coupling mechanism 412 may have a variety of configurations. For example, coupling mechanism 412 may include a threaded hub that may operatively engage a corresponding threaded aperture defined by plunger 414. As such, the description of coupling mechanism 412 should be taken as an example only and not to limit the scope of the disclosure.

While a "single component" fluid dispensing apparatus 400 is described in some implementations, it will be appreciated that any of the implementations (or combinations thereof) described throughout (e.g., shown in FIG. 1-4a, FIG. 5, FIG. 6, and FIG. 7) may be implemented with minor adaptations as a multiple component fluid dispensing apparatus (and vice versa) as shown in FIGS. 4b-4e and FIG. 8 and described above. For example, and referring also at least to FIG. 4b, and example multiple component fluid dispensing apparatus 400b is shown. It will be appreciated that the example dimensions shown in FIG. 4b may vary without departing from the scope of the disclosure. In some implementations, the above-noted motor (via dispensing process 10) may be configured to interact with cartridge 406 to dispense fluid from fluid dispensing apparatus 400b. For example, the above-noted motor 404 may include one or more drive rods (e.g., drive rods 410) having a respective coupling mechanism (e.g., coupling mechanism 412) disposed at its distal end. In some implementations, drive rods 410 may be configured to engage a fixed lead screw (e.g., fixed lead screw 411) with a nut (e.g., triangular nut 413). Coupling mechanism 412 may be configured to secure drive rods 410 to at least two pistons (e.g., plungers 414) associated with cartridge 406. In some implementations, as the above-noted motor 404 may cause triangular nut 413 to move in a forward or reverse direction, drive rods 410 and their respective plungers 414 similarly move, to create positive or negative pressure to dispense fluid via nozzle 416.

In some implementations, cartridge 406 may include two or more separate "tubes" (or the like) containing fluid. In some implementations, the fluid in each tube may be different, such as two fluid epoxy ingredients, that may be activated when mixed together as each fluid simultaneously is dispensed via nozzle 416. In some implementations, cartridge 406 may include a single fluid, where having two drive rods and plungers may help provide a more even distribution of force on cartridge 406 when the fluid is being dispensed. As such, and description of fluid dispensing apparatus 64 being a "single component" implementation should be taken as an example only and not to otherwise limit the scope of the disclosure.

As noted above, control signal 31 may be received 300 from base station 38, wherein control signal 31, when received 300, may cause fluid dispensing apparatus 400 to perform operations. For example, in some implementations, the operations may include dispensing process 10 generating 302 a positive pressure within a fluid cartridge (e.g., cartridge 406) of fluid dispensing apparatus 64 by adjusting, via motor 404 of fluid dispensing apparatus 64, drive rod 410 and piston (e.g., plunger 414) of fluid dispensing apparatus 64 in a first direction relative to fluid cartridge 406 to dispense fluid in fluid cartridge 406 via a nozzle (e.g., nozzle 416) of fluid dispensing apparatus 64, and the operations may include dispensing process 10 generating 304 a negative pressure within fluid cartridge 406 by adjusting, via motor 404, drive rod 410 and piston (e.g., plunger 414) in a second direction relative to fluid cartridge 406 to draw fluid into fluid cartridge 406 via nozzle 416. For instance, during operation, motor 404 (via dispensing process 10) may advance drive rod 410 and plunger 414, along the "+" direction of axis 418. This motion may generate a positive pressure within cartridge 406 and advance fluid contained within cartridge 406 onto a work piece via nozzle 416. In some implementations, after dispensing a particular volume of fluid onto the work piece, motor 404 may retract drive rod 410 and plunger 414 along the "−" direction of axis 418. This motion may generate a negative pressure within cartridge 406 and draw fluid from nozzle 416 back into cartridge 406, which may minimize leakage onto the work piece and reduce fluid wasting.

In some implementations, controller 402 may be configured to drive the operation of motor 404 based upon the received 300 control signal 31. For example, controller 402 may be operatively connected with, and receive 300 control signal 31, via a receiver (e.g., receiver 420). In some implementations, as noted above, receiver 420 may be configured as a wireless receiver configured to receive 300 control signal 31 as a wireless control signal from a signal source, such as base station 38, as described above. In some implementations, receiver 420 may be configured as a port, such as a USB port, where a user may insert a USB drive into the port and upload control signal 31 (e.g., as a set of operating instructions) to controller 402 as described above.

In some implementations, control signal 31 generated by dispensing process 10 may be configured to address a variety of operating parameters associated with fluid dispensing apparatus 64. For example, control signal 31 may include a cartridge volume value, which may relate to the volume of cartridge 406 carried by fluid dispensing apparatus 64. For instance, as noted above, cartridge 406 may be configured in a variety of volume or "syringe" sizes, such as 1 ounce, 2.5 ounces, 6 ounces, 8 ounces, 12 ounces, 20 ounces, and 32 ounces. In some implementations, control signal 31 may include a dispense volume value (e.g., in cubic centimeters), which may relate to the volume of fluid to be dispensed by fluid dispensing apparatus 64, a drive rod forward velocity value, which may relate to the speed of forward motion by fluid dispensing apparatus 64 when dispensing fluid, a drive rod retraction amount value, which may relate to the amount of "back off" (e.g., reverse) motion during a retraction of the drive rod, a drive rod retraction velocity value, which may relate to the speed of reverse motion by fluid dispensing apparatus 64 when minimizing leakage of the fluid from the cartridge onto a work piece, and a drive rod retraction time delay value, which may relate to the time delay between the sequential positive "+" and negative "−" motion of drive rod 410. Based upon, at least in part, these parameters associated with control signal 31, controller 402 (via dispensing process 10) may generate a drive signal (e.g., drive signal 422), which may drive motor 404 and control the volume of fluid dispensed from cartridge 406 during a dispensing procedure associated with dispensing process 10.

In some implementations, dispensing process 10 may be an automated process without requiring the use of an operator. In some implementations, and referring at least to FIG. 5, an operator (e.g., user 46) may depresses a "trigger" (e.g., trigger 424) to activate power source 408. In the example, based upon, at least in part, receiving a resulting power signal from activated power source 408, controller 402 (via dispensing process 10) may generate the above-noted drive signal 422 based upon, at least in part, the received 300 control signal 31 received 300 from base station 38. For example, based upon the information carried by control signal 31 (e.g., the volume of cartridge 406, the dispense volume value, the drive rod retraction velocity value, and the drive rod retraction time delay value), controller 402 may generate the corresponding drive signal 422, which may cause motor 404 to position drive rod 410 and plunger 414. For example, drive signal 422 may cause motor 404 to advance drive rod 410 and plunger 414 at a given rate from a first position (e.g., first position $424_1$) to a second position (e.g., second position $424_2$) relative to cartridge 406 to dispense a desired, metered volume of fluid from cartridge 406 via nozzle 416. In the example, drive signal 422 may further cause motor 404 to maintain the position of plunger 414 at second position $40_2$ for a particular duration of time (indicated by the above-noted drive rod retraction time delay value) and then to retract drive rod 410 and plunger 414 from second position $40_2$ to a third position (e.g., third position $40_3$) relative to cartridge 406. In the example, this motion may generate a negative pressure within cartridge 406, which may minimize leakage of the fluid from the cartridge onto a work piece.

In some implementations, in response to actuating drive rod 410 and plunger 414, motor 404 (via dispensing process 10) may be configured to generate a position signal (e.g., position signal 426) indicative of the position of the plunger 414 relative to cartridge 406, and may provide position signal 426 to controller 402, which may store position signal 426. For instance, assume for example purposes only that motor 404 is a stepper motor. In the example, the stepper motor (via dispensing process 10) may generate a set of counts that may indicate the position of plunger 414. Further in the example, controller 402 (via dispensing process 10) may store the count from motor 404, which may enable controller 402 (via dispensing process 10) to identify the position of plunger 414 (via position signal 426), and/or the remaining volume of fluid contained by cartridge 406. For example, if the count from motor 404 indicates that that the position of plunger 414 is (or estimated to be) half way through the total possible counts allotted to cartridge 406 (according to its size), controller 402 (via dispensing process 10) may identify that plunger 414 is half way between each end of cartridge 406, and may contain half of its original volume of fluid. In the example, should fluid dispensing apparatus 64 be used at intermittent times, controller 402 (via dispensing process 10) may maintain a record of the position of drive rod 410 and plunger 414 within fluid dispensing apparatus 64.

In some implementations, as indicated above, trigger 424 may be configured as an electrical activation mechanism. For example, engagement of trigger 424 may activate power source 408 to provide a power signal to controller 402. In the example, controller 402 (via dispensing process 10) may provide drive signal 422 to electrically activate motor 404.

It will be appreciated that a mechanical activation mechanism may be used without departing from the scope of the disclosure. For example, and referring at least to FIG. 6, an example fluid dispensing apparatus 64 is shown. In the example, fluid dispensing apparatus 64 may include a mechanical activation mechanism (e.g., mechanical activation mechanism 428), which may enable manual activation of motor 404. For instance, mechanical activation mechanism 428 may be configured in a variety of ways. For example, in some implementations, mechanical activation mechanism 428 may define a ring structure (e.g., ring structure 430). Ring structure 430 may enable a user to grasp and operate mechanical activation mechanism 428 in a relatively easy manner.

In some implementations, mechanical activation mechanism 428 may be disposed in operative communication with drive rod 410. For example, mechanical activation mechanism 428 may be configured as a series of linkage elements (e.g., linkage elements 432) pivotably connected to each other. Dispensing apparatus 64 may include a mode selector (e.g., mode selector 434), such as a switch, that may enable a user to select either the mechanical activation mechanism 428 or the electrical activation mechanism via trigger 424 as the motor controller.

In some implementations, as a user positions mechanical activation mechanism 428 along the "+" direction of axis 438, mechanical activation mechanism 428 may (via dispensing process 10) cause drive rod 410 to translate along the "+" direction of axis 418. This motion may generate the above-noted positive pressure within cartridge 406 and advance fluid contained within cartridge 406 onto a work piece via nozzle 416. In some implementations, following dispensing of the fluid, user 46 may position mechanical activation mechanism 428 along the "−" direction of axis 438, which may (via dispensing process 10) cause drive rod 410 to translate along the "−" direction of axis 418. This motion may generate the above-noted negative pressure within cartridge 406 and draw fluid from nozzle 416 back into cartridge 406.

As discussed above, motor 404 may interact with cartridge 406 to dispense fluid from the fluid dispensing apparatus 64 via coupling mechanism 412, which may secure drive rod 410 to a base portion (e.g., base portion 440) of cartridge 406. It will be appreciated that this implementations is an example, as other example implementations are possible without departing from the scope of the disclosure. For example, and referring at least to FIG. 7, in some implementations, motor 404 may include drive rod 410 and piston (e.g., load distribution plate 442) carried by drive rod 410. In the example, load distribution plate 443 may be disposed in proximity to base portion 440 of cartridge 406 and may (via dispensing process 10) be configured to move base portion 440 along axis 418. For example, motor 404 (via dispensing process 10) may advance drive rod 410 and load distribution plate 422 against base portion 440 of cartridge 406 along the "+" direction of axis 418. In the example, this motion may generate the above-noted positive pressure within cartridge 406 and advance fluid contained within cartridge 406 onto a work piece via nozzle 416. In the example, motor 404 may (via dispensing process 10) retract drive rod 410 and load distribution plate 422 along the "−" direction of axis 418. In the example, this motion may generate the above-noted negative pressure within cartridge 406 and draw fluid from nozzle 416 back into cartridge 406.

Figure 9:
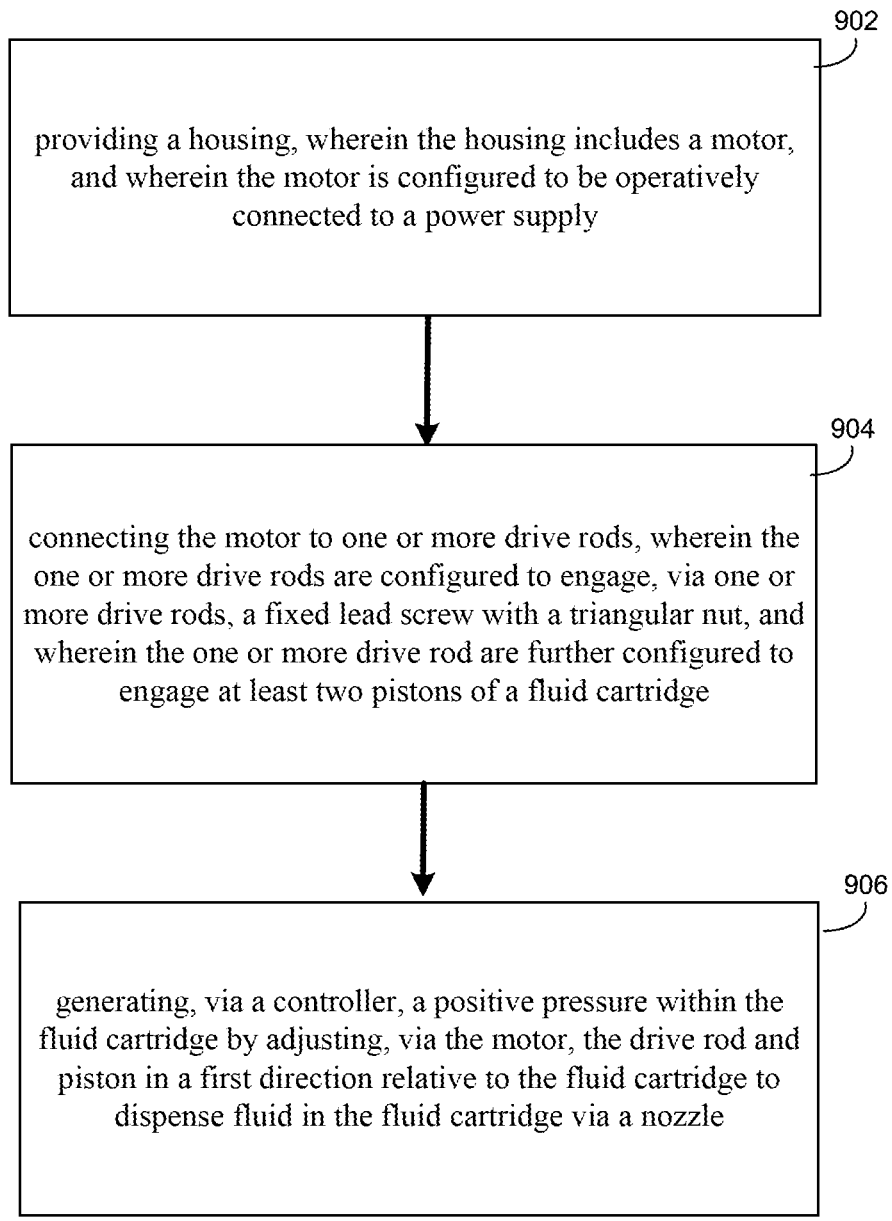
FIG. 9 is an example flowchart depicting operations according to one or more example implementations of the disclosure.

Referring now to FIG. 9, a flowchart 900 consistent with embodiments of the present disclosure is provided. The method may include providing (902) a housing, wherein the housing includes a motor, and wherein the motor is configured to be operatively connected to a power supply. The method may include connecting (904) the motor to one or more drive rods, wherein the one or more drive rods are configured to engage, via one or more drive rods, a fixed lead screw with a triangular nut, and wherein the one or more drive rod are further configured to engage at least two pistons of a fluid cartridge. The method may further include generating (906), via a controller, a positive pressure within the fluid cartridge by adjusting, via the motor, the drive rod and piston in a first direction relative to the fluid cartridge to dispense fluid in the fluid cartridge via a nozzle.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents (e.g., of all means or step plus function elements) that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. An apparatus, comprising:
a housing, wherein the housing includes a motor, and wherein the motor is configured to be operatively connected to a power supply;
wherein the motor is further configured to be operatively connected to one or more drive rods, wherein the one or more drive rods are configured to engage a fixed lead screw with a triangular connector, and wherein the one or more drive rods are further configured to engage at least two pistons of a fluid cartridge;
wherein the housing further includes a controller configured to be operatively connected to the power supply, the controller configured to:
generate a positive pressure within the fluid cartridge by adjusting, via the motor, drive rods of the of the one or more drive rods and the at least two pistons in a first direction relative to the fluid cartridge to dispense fluid in the fluid cartridge via a nozzle; and
a triangular hatch configured to mate with the triangular connector, wherein the triangular hatch, when removed, enables a user to manually spin the fixed lead screw to engage the drive rods of the one or more drive rods with the at least two pistons.

2. The apparatus of claim 1, wherein the controller is configured to generate a drive signal to the motor to generate the positive and negative pressure within the fluid cartridge based upon a control signal.

3. The apparatus of claim 1, wherein the controller is further configured to receive a position signal from the motor, the position signal indicating a position of the piston relative to the fluid cartridge.

4. The apparatus of claim 2, wherein the controller is further configured to generate the drive signal based upon receiving at least one of a cartridge volume value, a dispense volume value, a drive rod retraction velocity value, and a drive rod retraction time delay value, wherein the drive signal indicates how much adjustment of the drive rods of the one or more drive rods and the at least two pistons occurs in at least one of the first and second direction.

5. The apparatus of claim 1 wherein the motor includes a stepper motor.

6. The apparatus of claim 1 wherein the piston includes at least one of a plunger and a load distribution plate.

7. A fluid application system, comprising:
at least one dispensing apparatus including:
a housing, wherein the housing includes a motor, and wherein the motor is configured to be operatively connected to a power supply;
wherein the motor is further configured to be operatively connected to one or more drive rods, wherein the one or more drive rods are configured to engage a fixed lead screw with a triangular connector, and wherein the one or more drive rods are further configured to engage at least two pistons of a fluid cartridge;
wherein the housing further includes a controller configured to be operatively connected to the power supply, the controller configured to:
generate a pressure within the fluid cartridge by adjusting, via the motor, drive rods of the one or more drive rods and the at least two pistons in a first direction relative to the fluid cartridge to dispense fluid in the fluid cartridge via a nozzle; and
a triangular hatch configured to mate with the triangular connector, wherein the triangular hatch, when removed, enables a user to manually spin the fixed lead screw to engage the drive rods of the one or more drive rods with the at least two pistons.

8. The fluid application system of claim 7, wherein the controller is configured to generate a drive signal to the motor to generate the pressure within the fluid cartridge based upon a control signal.

9. The fluid application system of claim 8, wherein the controller is further configured to generate the drive signal based upon receiving at least one of a cartridge volume value, a dispense volume value, a drive rod retraction velocity value, and a drive rod retraction time delay value, wherein the drive signal indicates how much adjustment of the drive rods of the one or more drive rods and the at least two pistons occurs in at least one of the first and second direction.

10. The fluid application system of claim 7, wherein the controller is further configured to receive a position signal from the motor.

11. The fluid application system of claim 7 wherein the motor includes a stepper motor.

12. The fluid application system of claim 7 wherein each of the at least two pistons includes at least one of a plunger and a load distribution plate.

13. A method, comprising:
providing a housing, wherein the housing includes a motor, and wherein the motor is configured to be operatively connected to a power supply;
connecting the motor to one or more drive rods, wherein the one or more drive rods are configured to engage, via the one or more drive rods, a fixed lead screw with a triangular connector, and wherein the one or more drive rod are further configured to engage at least two pistons of a fluid cartridge;
generating, via a controller, a positive pressure within the fluid cartridge by adjusting, via the motor, drive rods of the one or more drive rods and the at least two pistons in a first direction relative to the fluid cartridge to dispense fluid in the fluid cartridge via a nozzle;
removing a triangular hatch configured to mate with the triangular connector,
enabling a user to manually spin the fixed lead screw, after the triangular hatch is removed, to engage the drive rods of the one or more drive rods with the at least two pistons.

14. The method of claim 13, further comprising:
generating a drive signal to the motor to generate the positive and negative pressure within the fluid cartridge based upon a control signal.

15. The method of claim 13, further comprising:
receiving a position signal from the motor, the position signal indicating a position of the at least two pistons relative to the fluid cartridge.

16. The method of claim 14, further comprising:
generating the drive signal based upon receiving at least one of a cartridge volume value, a dispense volume value, a drive rod retraction velocity value, and a drive rod retraction time delay value, wherein the drive signal indicates how much adjustment of the drive rods of the one or more drive rods and the at least two pistons occurs in at least one of the first and second direction.

17. The method of claim 13 wherein the motor includes a stepper motor.

18. The method of claim 13 wherein each of the at least two pistons includes at least one of a plunger and a load distribution plate.

\* \* \* \* \*